(12) United States Patent
Krishnaswamy et al.

(10) Patent No.: US 7,457,817 B2
(45) Date of Patent: Nov. 25, 2008

(54) VERSIONING IN AN INTEGRATION PLATFORM

(75) Inventors: Janaki Krishnaswamy, Redwood Shores, CA (US); Bhagat Vikram Nainani, Fremont, CA (US); Oleg Y Nickolayev, Redwood Shores, CA (US); Vishal Saxena, Belmont, CA (US); William George Stallard, San Francisco, CA (US); David Wheeler Bruce Thompson, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 623 days.

(21) Appl. No.: 10/734,860

(22) Filed: Dec. 12, 2003

(65) Prior Publication Data

US 2005/0131870 A1    Jun. 16, 2005

(51) Int. Cl.
 *G06F 7/00* (2006.01)
(52) U.S. Cl. .............................. 707/102; 707/1; 707/2; 707/3; 707/10
(58) Field of Classification Search .................. 707/203, 707/1, 2, 3, 10, 102
See application file for complete search history.

(56) References Cited

U.S. PATENT DOCUMENTS

| | | | |
|---|---|---|---|
| 5,181,162 A | | 1/1993 | Smith et al. |
| 5,905,990 A | * | 5/1999 | Inglett ........................ 707/200 |
| 6,347,388 B1 | | 2/2002 | Hollander |
| 6,460,052 B1 | * | 10/2002 | Thomas et al. .............. 707/203 |
| 6,868,425 B1 | * | 3/2005 | Bergstraesser et al. .. 707/103 R |
| 2003/0115223 A1 | * | 6/2003 | Scott et al. ................... 707/203 |

OTHER PUBLICATIONS

S. Ducasse et al., "A Reflective Model for First Class Dependencies", published in Proceedings of ACM OOPSLA'95, pp. 265-280, 1995.

(Continued)

*Primary Examiner*—Hung Q Pham
(74) *Attorney, Agent, or Firm*—Silicon Valley Patent Group LLP; Omkar Surysdevara

(57) ABSTRACT

A repository contains multiple versions of an object but only a single version of the object is supplied when a query is made. The single version is automatically selected from among a number of versions that are otherwise returned in response to the query, based on a configuration associated with a workspace in which the query originates. The selected version of the object is then presented in a version resolved view, without exposing any information related to versioning of the object. Specifically, a number of configurations are established, each configuration containing no more than one version of each object in the repository. However, only one configuration is associated with each workspace from which a query can originate. The configuration that is associated with the workspace depends on whether the workspace is to be used for design of the repository or for use of the repository during live operation. Specifically, a single configuration (hereinafter "design time" configuration) is commonly associated with the workspaces of all developers. When the developers decide that a set of objects in the repository is ready for use in live operation, the set of objects is "deployed" by copying the design time configuration to generate a new configuration (hereinafter "run time" configuration) that contains the most current versions of all objects (as present in the design time configuration). Any number of run time configurations can co-exist with each other and with the design time configuration.

16 Claims, 8 Drawing Sheets

OTHER PUBLICATIONS

S. Ducasse, "Inheritance Mechanism Reification by Means of First Class Object", published in Proceedings of the IJCA'95 workshop on Reflection and MetaLevel Architectures and their Applications in AI, pp. 39-49, 1995.
U.S. Appl. No. 10/734,860, filed Dec. 12, 2003.
Office Action dated Jun. 20, 2006 in U.S. Appl. No. 10/734,860.
Amendment dated Sep. 20, 2006 in U.S. Appl. No. 10/734,860.
Notice of Allowance dated Nov. 20, 2006 in U.S. Appl. No. 10/734,860.
Amendment dated Feb. 20, 2007 in U.S. Appl. No. 10/734,860.
U.S. Appl. No. 10/735,217, filed Dec. 12, 2003 by Vishal Saxena et al.
Office Action dated Jun. 20, 2006 in U.S. Appl. No. 10/735,217.
Amendment dated Sep. 20, 2006 in U.S. Appl. No. 10/735,217.
Notice of Allowance dated Nov. 20, 2006 in U.S. Appl. No. 10/735,217.
Amendment dated Feb. 20, 2007 in U.S. Appl. No. 10/735,217.

* cited by examiner

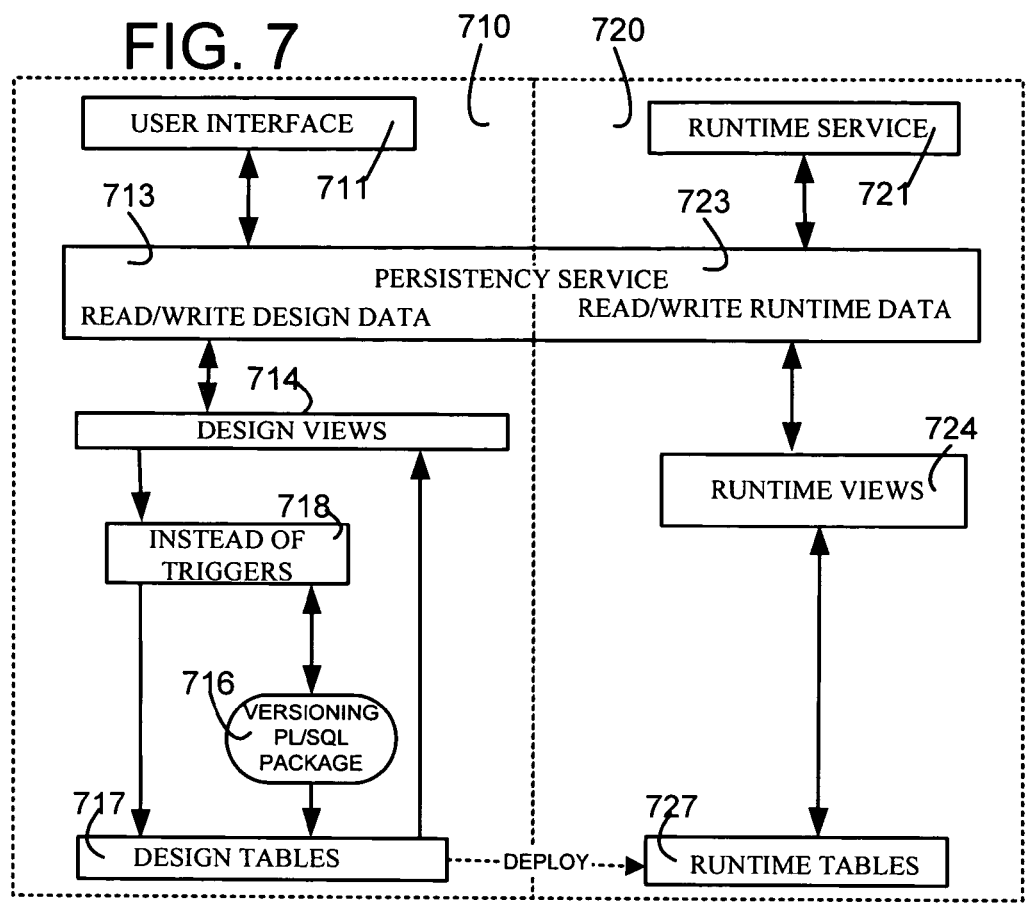
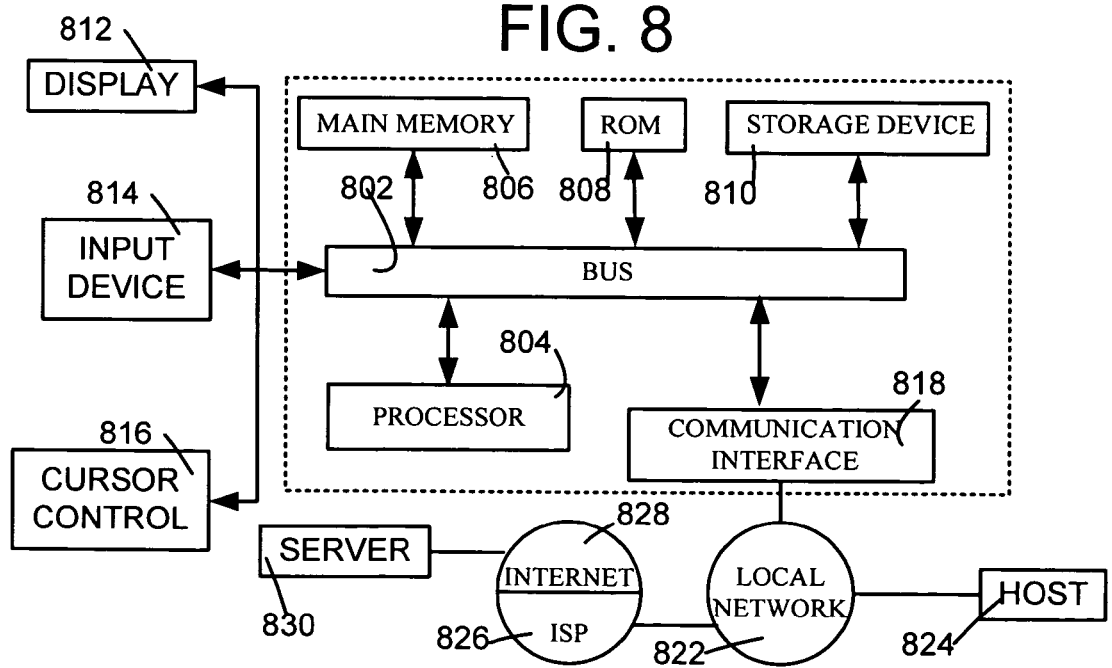

VERSIONING IN AN INTEGRATION PLATFORM

CROSS-REFERENCE TO RELATED APPLICATION

This application is related to and incorporates by reference herein in its entirety, U.S. patent application Ser. No. 10/735,217 entitled "OBJECT VERSIONING" by Vishal Saxena, that is filed concurrently herewith.

BACKGROUND OF THE INVENTION

An integration platform supports the modeling and execution of complex integration scenarios, both within the enterprise and externally with remote trading partners. A user will model such an integration using design tools which in turn represent the integration scenario as a set of structured objects with complex inter relationships. The objects representing the integration are stored using a relational database schema to allow for transactional, multiple user access to the scenario. To fully support the life cycle of an integration scenario it is desirable for an integration platform to support versioning of the objects representing integration scenarios.

Versioning of files by source control systems is typically achieved by storing either the first or latest version in completeness and deltas (the differences) to recreate other versions. This is a very space efficient scheme however it is computationally expensive to recreate a particular version. To support versioning of objects stored in a relational database schema is considerably more complicated as the objects have structure and inter-relationships that must be considered as part of the versioning process.

A naive approach to implement versioning for objects stored as rows in database tables would be to clone the row the representing the object. However this leads to issues with object relationship known as the 'cloning chain reaction'. Consider the example of a department with employees. If a new version of department x is desired, then the row for x is cloned, however the employees related to the previous version of x will not be associated with the new version. Therefore the employees must also be versioned by cloning, even though the requested versioning operation was to version the department. In a more complex object model the cloning would also happen for the other relationships on employee to related objects and so on. Hence versioning a department requires a chain reaction of versioning operations on all related objects. This approach therefore does not allow for fine grain versioning.

Storing of multiple versions of a particular object is described in U.S. Pat. No. 6,460,052 granted to Thomas et al. on Oct. 1, 2002 and entitled "Method and system for performing fine grain versioning". U.S. Pat. No. 6,460,052 is incorporated by reference herein in its entirety. Specifically, U.S. Pat. No. 6,460,052 states (see Abstract) that a table includes one or more additional columns for storing version information on each object being stored in the table. In response to a request from a user to retrieve a particular object, a version of the particular object to present to the user is automatically determined based on a workspace associated with the user. The version of the particular object is presented to the user without exposing to the user values from the one or more columns in which version information is stored.

According to U.S. Pat. No. 6,460,052 (see column 5, lines 18-26), in one embodiment, each user has a "working context" that defines the set of objects that can be seen by the user. The user accesses the user's working context through a "version resolved view". The working context of a user defines a set of "configurations" that are associated with the user's workspace. A configuration is a collection of object versions, where each object version in the configuration is for a different object.

U.S. Pat. No. 6,460,052 further states (see column 11, lines 40-50) that when an object is inserted, deleted or updated within a version-resolved view, one or more triggers evaluate access control to determine whether or not the operation can be performed. If the operation is allowed, the triggers of U.S. Pat. No. 6,460,052 construct subordinate SQL that is necessary to insert, delete or update the object within the table, and create the configuration members so that the object can be seen in a subsequent select operation back through the version-resolved view, inserts the object into the current working folder so that it will be seen when navigating the folder, and does the background evaluation of the constraints for generating the corresponding version history information. U.S. Pat. No. 6,460,052 also describes (in column 14, lines 25-45) a set of utilities that automate the process of making software changes.

U.S. Pat. No. 6,460,052, also states (see column 6, lines 14-22) that by providing each user a current working context in which only one version of each object is visible, the database tools can use the repository without having to be aware of the additional complexity that is introduced by version control. In this manner, all work that is performed to track and maintain version information is transparent to the tool. Thus, existing tools that were not designed to support versioning can obtain the benefit of version control without having to be modified.

U.S. Pat. No. 6,460,052 also describes (see column 7, lines 16-25) a table (called "configuration members") that provides a mapping of configurations to the specific object versions that are associated with the configurations. As previously described, a configuration is a collection of objects that are related in some way that is significant to the user. For example, a configuration may represent all the objects that make up a given component or release. Using the configuration members table, a version control mechanism identifies the specific objects and the specific object versions that make up a particular configuration.

Moreover, the version control mechanism (see column 5, lines 12-21) maintains a user workspace for each user. The user workspace of a user includes an object version of each of the objects that have been "checked-out" by the user. The version control mechanism protects the object versions in a user's workspace from changes by other developers. In one example, each user has a "working context" that defines the set of objects that can be seen by the user. The user accesses the user's working context through a "version resolved view".

The working context table (see column 7, lines 49-59) defines a list of configuration objects that are currently mapped to a user's workspace. In one example, each user is provided with a private working context. The working space provides a view of those data items that the user is currently working on ("version resolved view") and protects those data items from being changed by others. A working context may include both structured and non-structured data. Thus, a private working context may include not only file based information but also information that is stored within a table.

Note that when using the methods of U.S. Pat. No. 6,460,052, although a cloning chain reaction is avoided for relationships among first class objects, all objects contained in a first class object are themselves cloned each time the first class object is versioned.

Also incorporated by reference herein in their entirety are the following two articles which disclose first class objects:

(1) an article by S. Ducasse, M. Blay-Fornarino, and A. M. Pinna-Dery, entitled "A reflective model for first class dependencies" published in Proceedings of ACM OOPSLA '95, pages 265-280, 1995, which is available at the URL http://citeseer.nj.nec.com/article/ducasse95reflective.html (2) an article by S. Ducasse entitled "Inheritance mechanism reification by means of first class object" published in Proceedings of the IJCAI'95 workshop on Reflection and MetaLevel Architectures and their Applications in Al, pages 39-49, 1995, which is available at the URL http://citeseer.nj.nec.com/ducasse95inheritance.html

SUMMARY

A computer is programmed in accordance with the invention (hereinafter "integration platform") to maintain a repository that contains multiple versions of an object, and only supplies a single version of the object when a query is processed, by use of a set of identifiers (called "configuration"). Specifically, the configuration is set up ahead of time, to identify only one version of one or more objects in the repository. In several embodiments, an integration platform of this invention obtains from a workspace in which the query originates, the identity of a configuration to be used in processing the query. Thereafter, the integration platform automatically selects a version of the object identified in the configuration, from among a number of versions of that object that are otherwise returned by the repository in response to the query. The integration platform then presents the selected version of the object to the user (or other software/system), without exposing multiple versions of the object, e.g. as a version resolved view. In some embodiments of the integration platform, no information about versioning is exposed, although in other embodiments a version number of the object is made available under certain circumstances.

In several embodiments of the integration platform, a number of configurations are established, and each configuration contains no more than one version of any object in the repository. Moreover, in accordance with the invention, the integration platform associates only one configuration with each workspace from which a query can originate. The configuration that is associated with a workspace depends on whether the workspace is to be used for design of the repository or for use of the repository during execution of an application (e.g. a business process). Specifically, a single configuration (hereinafter "design time" configuration) is associated with the workspaces of each of any number of developers that may be working on the repository. Note that the term "developers" is used herein to refer to users who are changing or creating objects in the repository. The design time configuration identifies the most current versions of objects in the repository. Since the same configuration is associated with the workspace of each developer, all developers are exposed to a change that is made by any developer, depending on the embodiment. As to whether any developer immediately sees the change may depend on, for example whether or not a persistency service is used with a cache between the repository and the developer, and the frequency of update of such a service.

When the developers decide that a set of objects in the repository is ready for use in live operation (i.e. usage without changing the objects), the set of objects is "deployed" by making a copy of the design time configuration. The copied configuration (also called "run time configuration") identifies the most current versions of all objects (i.e. versions that are currently present in the design time configuration at the time of deployment). During deployment in some embodiments, the current version of each object is not actually copied to create a new object, and instead just identifiers of objects and the version numbers of the current versions of objects are copied. However, some other embodiments use two repositories, and in such embodiments, during deployment the identifiers and version numbers are copied to form a copied configuration, and in addition the objects themselves are also copied from a design time repository to a run time repository.

Changes to versions of objects identified by the design time configuration do not affect versions of objects identified by the run time configuration regardless of whether the embodiments use a single repository or two repositories. Specifically, the just-described run time configuration (and the information identified thereby) is kept unchanged (i.e. never changed). If any change needs to be made to a deployed set of objects, the change is made to the design time configuration and the objects identified thereby. For example, an object is changed by creating a copy of the object (in the same repository), replacing a version number of the object in the copy with an incremented version number, and making a change in the copy thereby to create a new version of the object. Thereafter, to deploy the change, a new run time configuration is now created, by copying the newly-changed design time configuration (as described above).

In such embodiments, the new run time configuration co-exists with the initially-created run time configuration, and both run time configurations co-exist with the design time configuration, all in the same repository. For this reason, it is possible for a single object to have as many versions in the repository as the number of configurations. Regardless of the number of object versions and the number of configurations, any configuration can be used to individually (by itself) uniquely identify a version of one or more objects that are responsive to a query.

Some embodiments classify all objects in the repository into two types: objects that are not contained in (or aggregated into) any other object (and such objects are called "first class objects"), and objects which are contained in (or aggregated into) another object (and such objects are called "secondary objects"). In the just-described embodiments, prior to inserting, updating or deleting any object, the object's classification is first checked, and the actions that are performed thereafter depend on whether or not the object is a first class object.

When using some methods of the type discussed next, versioning of a first class object does not require versioning of each secondary object contained therein, and instead, a secondary object is versioned on an as-needed basis. Therefore, such methods eliminate excessive cloning of secondary objects (which happens in the prior art methods discussed in the background section above). Specifically, when an object is to be inserted into the repository for the first time, if the object is a first class object, then it is inserted in the normal manner, and in addition, the design time configuration may be changed to identify the newly-added object. Note that at this stage the object (on insertion) is labeled as having version 1. When a previously-inserted object is to be updated, and the object is a first class object, then a check is made as to whether this object has been deployed (or belongs to any configuration other than design time), and if so a new version of the object is created, the design time configuration is updated to now identify the new version of the object, and the update is made on the new version of the object. If the object to be updated is a first class object that was not deployed, then the object is directly updated.

When deleting a previously-inserted object, if the object is a first class object, then the same check is made as in updating, i.e. whether this object has been deployed (or belongs to any configuration other than design time), and if not then this object is deleted from the repository, and an entry for this object is removed from the design time configuration. If the object to be deleted has been deployed (or belongs to any configuration other than design time), then the object itself is not deleted from the repository, and instead an entry for the object in the design time configuration is simply removed (so that the object can continue to be available to users of one or more run time configurations).

In case of secondary objects, actions similar to those discussed above are made except that versioning is performed on the first class object that contains the secondary object (either directly or indirectly through an ancestor (e.g. parent or grandparent) of the secondary object, if the ancestor is contained in the first class object). For example, when inserting a secondary object, if a version of the first class object that is to contain the secondary object (either directly or indirectly) is not yet deployed, then the secondary object is simply inserted into the repository. If the just-described first class object is deployed, then in addition to inserting the secondary object into the repository, the first class object is versioned (e.g. cloned and tables updated, to form a new version of the first class object) and the new version of the first class object then contains the newly-inserted secondary object.

When updating (or deleting) a secondary object, the above-described check is again made, i.e. whether a version of the first class object that contains the secondary object (either directly or indirectly) is not yet deployed. If the just-described first class object is in fact deployed, then the first class object is versioned (e.g. updated in the above-described manner to form a new version of the first class object) and the new version of the first class object then contains the updated secondary object (or is changed to not contain the secondary object, if the secondary object is being deleted).

In some embodiments, each secondary object is associated with three additional storage elements (such as columns in a database table or variables in a software program). Specifically, two storage elements indicate the lowest version and the highest version of the first class object which contains the secondary object, and a third storage element contains an identifier of the first class object. In such embodiments, if a version of the first class object that contains the secondary object (either directly or indirectly) is not deployed, then the storage element for the secondary object which holds the lowest version number of the first class object is checked to see if it contains a value that is same as the current version number of the first class object. If same, then the secondary object is updated (or deleted if a deletion operation is being performed). If not the same, then the storage element containing the highest version is set to one less than the current version of the first class object, and in case of deletion operation nothing further needs to be done whereas in case of updating, a new version of the secondary object is created (by inserting, into the storage elements for the new version of the secondary object the following: the current version of the first class object is inserted in the lowest version storage element, and infinity is inserted in the highest version storage element).

In one specific embodiment, the above-described repository as well as the configurations are implemented by tables in a relational database. Specifically, all the versions of an object are stored in a table (also called "base table"), and for each object type there is one such table (i.e. there is a single "base" table for each type of object contained in the repository). In this embodiment, the base table for each object contains a number of columns that are normally used to hold such objects. In addition, base tables for first class objects contain one additional column to hold a version number of the first class object. Furthermore, base tables for secondary objects contain three additional columns, one for each of the above-described storage elements. In addition, the relational database of this embodiment also includes a configuration table. One exemplary implementation assigns a unique identifier to each object regardless of the type of data and/or software in the object. In such an implementation, the configuration table has one column for the object identifier, another column for the object's version, so that the two columns together in combination uniquely identify a single version of a single object. In the just-described implementation, the configuration table also includes a third column that holds an identifier (such as a text string which identifies a name) of the configuration.

BRIEF DESCRIPTION OF DRAWINGS

FIG. 7 illustrates, in a high level block diagram, various software components used in some embodiments of the programmed computer of FIG. 1A.

FIG. 8 illustrates, in a high level block diagram, various hardware components used in some embodiments of the programmed computer of FIG. 1A.

DETAILED DESCRIPTION

Figure 1A:
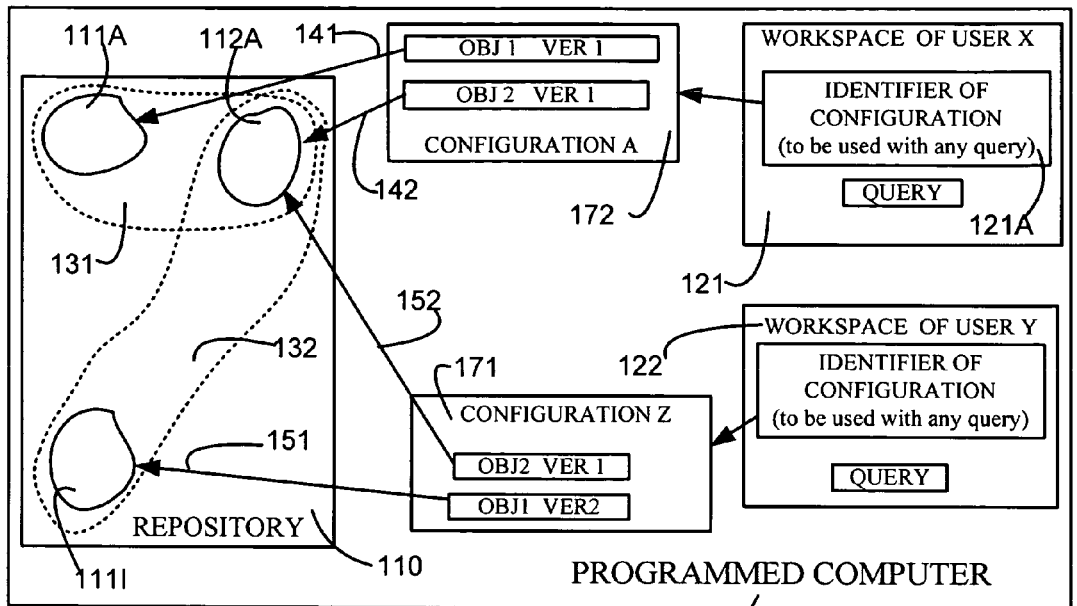
FIG. 1A illustrates, in a high level block diagram, a computer programmed in accordance with the invention to associate a single configuration with a workspace for use in processing a query from the workspace to identify a single version of each object responsive to the query, from a repository that contains multiple versions of one or more objects.

A computer 100 (FIG. 1A) is programmed in accordance with the invention (hereinafter "integration platform") to maintain a repository 110 that contains multiple versions of an object. For example, an object called "OBJ1" is shown in FIG. 1A as having two versions, namely version 1 (labeled as item 111A in FIG. 1A) and version 2 (labeled as item 111I in FIG. 1A). Normally, when a query is made to repository 110, repository 110 returns both versions (i.e. version 1 and version 2) of the single object OBJ1 in response to the query. However, integration platform 100 is programmed to supply only a single version, e.g. version 1 only or version 2 only, depending on which workspace (workspace 121 of user X or workspace 122 of user Y) originated the query. For example, when processing a query from workspace 121, integration platform 100 uses a pair of identifiers, namely an object identifier and version number, that are held in a configuration 172, to uniquely identify version 1 of object OBJ1 (i.e. item 111A), as illustrated by arrow 141.

The just described configuration 172 is a set that may contain any number of pairs of identifiers, one pair for each object that may be responsive to a query from workspace 121. Configuration 172 is itself identified in workspace 121, by an identifier 121A which may be held in, for example, a system variable. In the example illustrated in FIG. 1A, configuration 172 also contains another pair of identifiers that together uniquely identify version 1 of object OBJ2 (i.e. item 112A), as illustrated by arrow 142. Moreover, FIG. 1A also illustrates another configuration, namely configuration 171 which contains two pairs of identifiers that respectively identify objects OBJ1 and OBJ2 as illustrated by arrows 151 and 152, but note that arrow 151 points to version 2 of OBJ1 (labeled as item 111I) while arrow 152 points to version 1 of OBJ2 (labeled as item 112A).

In several embodiments, configurations 171 and 172 are set up ahead of time, to directly identify only one version of one or more objects in repository 110. Moreover, in some embodiments, each workspace, such as workspace 121 is associated with only one configuration, e.g. configuration 172. Although any number of workspaces can be associated with a configuration, each workspace is associated with only one configuration in such embodiments, so that integration platform 100 automatically identifies a single version of an object from among multiple versions in repository 110. Integration platform 100 presents a selected version of the object (e.g. object 111A), without exposing any information related to versioning of the object e.g. as a version resolved view.

In an example illustrated in FIG. 1A, the two queries from workspaces 121 and 122 are identical, and in response repository 110 retrieves data from two objects, namely OBJ1 and OBJ2. Configuration 172 is shown as containing two pairs of identifiers, each of which directly identifies one version of each of the two objects 111A and 112A. As will be apparent to the skilled artisan, such a configuration can contain as many such pairs as there are objects in repository 110, although some configurations may contain fewer pairs than the number of objects. Therefore, in response to the query from workspace 121, only objects 111A and 112A are presented in a version resolved view 131, although repository 110 contains an additional object 111I that is also responsive to the query. Note that when another user Y issues the same query from workspace 122, only objects 111I and 112A are presented in another version resolved view 132. In several embodiments, neither of the two users X and Y needs to be aware of any versioning information when they generate their queries. Instead, each user's workspace 121, 122 is set up ahead of time (either automatically or manually), to contain a single identifier of the respective configuration 172,171 that is to be used in generating their respective version resolved views 131, 132.

Figure 1B:
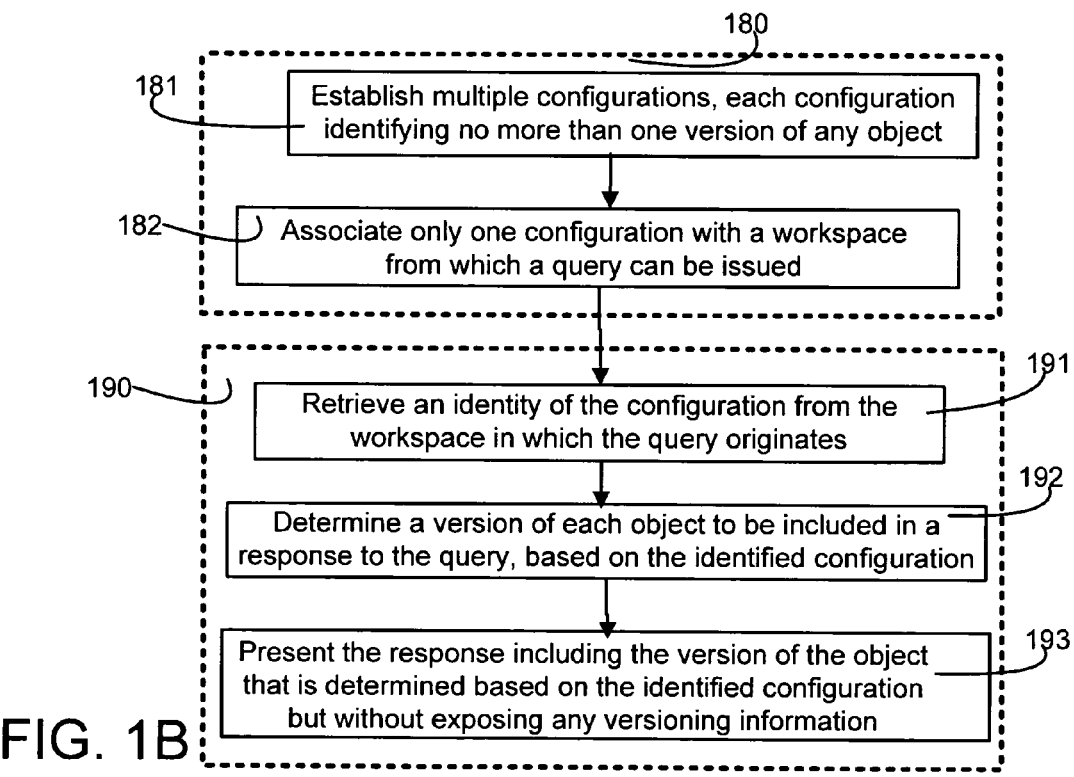
FIG. 1B illustrates, in a flow chart, acts performed by the computer of FIG. 1A in certain embodiments of the invention.

In several embodiments of the integration platform 100, a number of configurations A . . . Z are established (as per act 181 in FIG.1B), and each configuration J (wherein A≦J≦Z) contains pairs of identifiers that identify no more than one version of any object in repository 110. Moreover, integration platform 100 of such embodiments associates only one configuration J with each workspace from which a query can originate (as per act 182 in FIG. 1B). The just described association of a single configuration with each workspace is believed to be patentably distinguishable over the use of multiple configurations which are described in the above-discussed U.S. Pat. No. 6,460,052.

Moreover, when processing a query, integration platform 100 of several embodiments performs the following acts: (a) obtains an identity of a single configuration directly from a workspace in which the query originates (as per act 191 in FIG. 1B), (b) uses this single configuration to directly identify a single version of each object that is to be included in a response to the query (as per act 192 in FIG. 1B), and (c) presents the response including the version of the object that is identified from among multiple versions of the object, but without exposing any versioning information (e.g. in views called "version resolved views"). Each of acts (a) and (b) individually is believed to patentably distinguish the operation of integration platform 100, in view of the use of multiple configurations in U.S. Pat. No. 6,460,052 as discussed elsewhere herein.

Note that although acts 181-182 (that form an operation 180 for setting up configurations), and acts 191-193 (that form another operation 190 for using a configuration to generate version resolved views) are discussed above in reference to certain embodiments of integration platform 100, other embodiments may only perform one of these acts, or a combination of a subset of these acts, in addition to performing other acts. For example, certain embodiments of integration platform 100 may perform only acts 181 and 182 of operation 180, and may implement operation 190 in a different manner. As another example, some embodiments of integration platform 100 may perform only acts 191 and 193 of operation 190, and may implement operation 180 in a different manner.

In one such embodiment, act 182 is not performed in operation 180 and instead a single workspace is associated with two configurations (e.g. the workspace contains two configuration identifiers) that are identical in the objects included therein but at least one object in one of the configurations has a different version. In this specific embodiment, the user must explicitly select one of the two configurations as the configuration to be used in processing a query being issued. Such an embodiment is useful in testing backward compatibility of a query, e.g. by performing operation 190 after selecting each of the two configurations, one at a time, to obtain two sets of results. In the just-described example, the two configurations represent (a) a configuration that has been released to customers and (b) another configuration that is yet to be released. If the two sets of results (after performing operation 190 on each configuration) are identical then the user gains confidence in backward compatibility. Note that the two sets of results in the just-described example do not contain any versioning information (as per act 193). Other such embodiments will be apparent to the skilled artisan in view of this disclosure.

Specifically, U.S. Pat. No. 6,460,052 discloses an example in which a table (called "working context table") 204 maps version "1" of configuration "1", version "1" of configuration "2" and version "1" of configuration "4" to user workspace 202. Hence, U.S. Pat. No. 6,460,052 discloses mapping of multiple configurations to a single workspace. Moreover, U.S. Pat. No. 6,460,052 discloses a different technique (see column 6, lines 14-22), wherein each user is provided with a current working context in which only one version of each object is visible.

As illustrated in FIG. 2 of U.S. Pat. No. 6,460,052, user workspace 202 has two pointers that respectively point to two rows of a table that contains two different configuration IDs, namely ID1 and ID4 (although these two rows contain the same working context ID W1 and also the same configuration version 1). In addition to the working context table 204, U.S. Pat. No. 6,460,052 further discloses in FIG. 2 a configuration members table 206 that provides a mapping of configurations to specific object versions. Therefore, to uniquely identify a single version of an object from a user's workspace, U.S. Pat. No. 6,460,052 requires use of two tables each of which must be looked up (i.e. two look ups).

In contrast to U.S. Pat. No. 6,460,052, several embodiments of the invention associate only a single configuration with each workspace, as described herein. Specifically, use of a single configuration requires only one hop in such embodiments of the invention, to go from a user's workspace to a version resolved view of an object. Moreover, only one table is required in addition to a repository when the configuration is implemented in a relational database, of the type described in U.S. Pat. No. 6,460,052.

Note that even if a single table is generated in the prior art by compiling a list of configurations into a single list of object versions for each specific work area, such use of U.S. Pat. No. 6,460,052 requires a compilation step, and this step is therefore eliminated by embodiments of the invention that associate only a single configuration with each workspace.

Figure 2A:
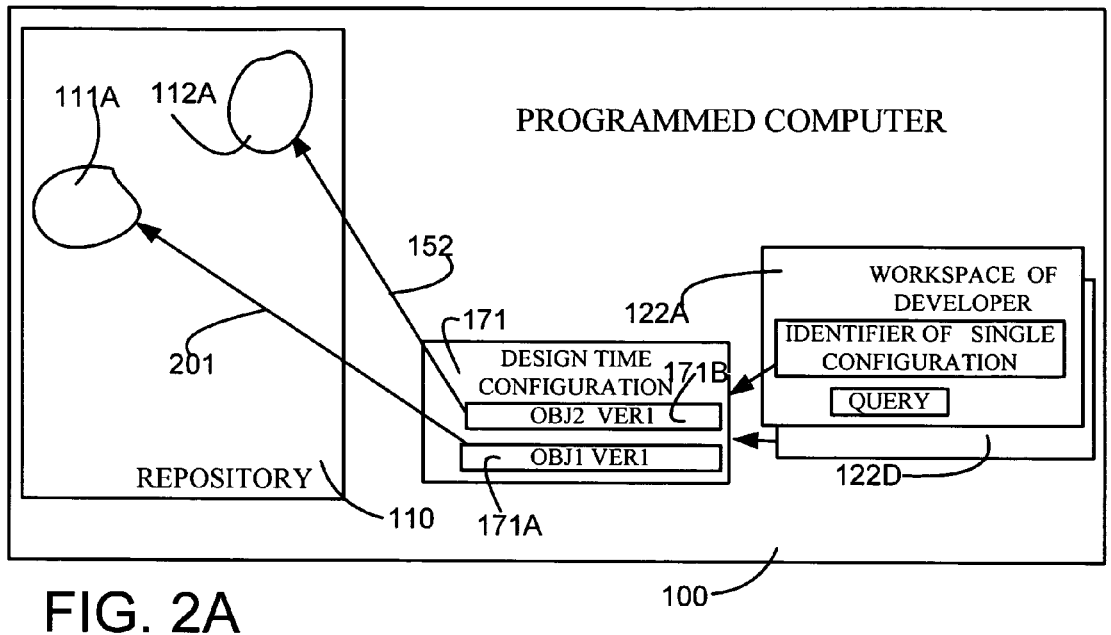
FIGS. 2A-2E illustrate, in high level block diagrams, copying of a design time configuration to create run time configurations without cloning objects, and the cloning of an object only when making a change to the object.
Figure 2B:
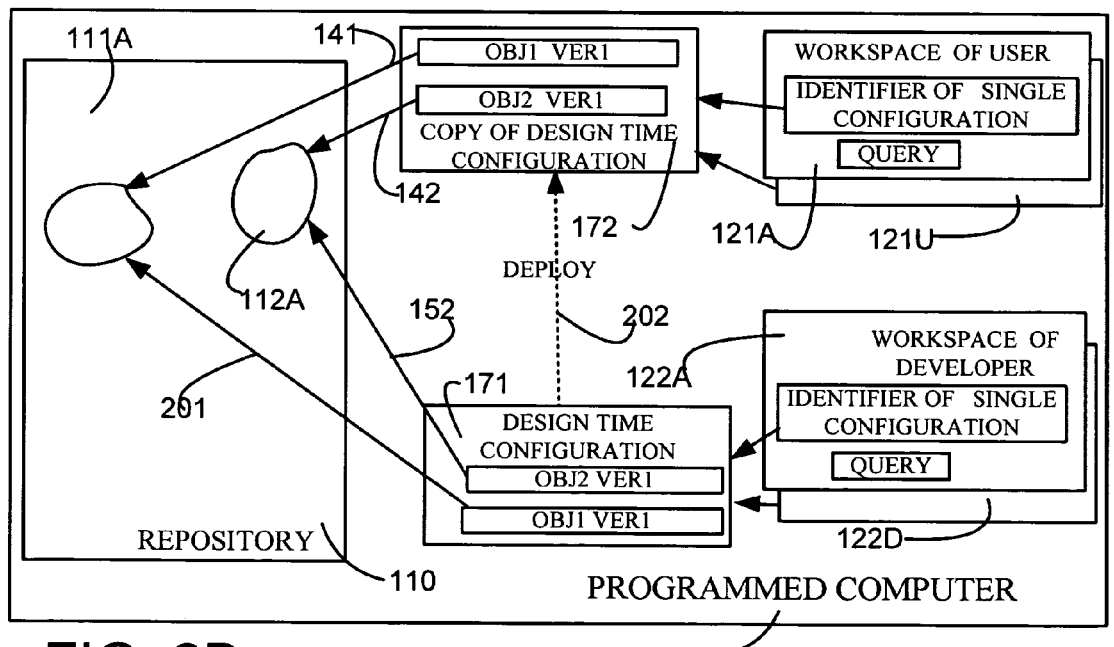
Figure 2C:
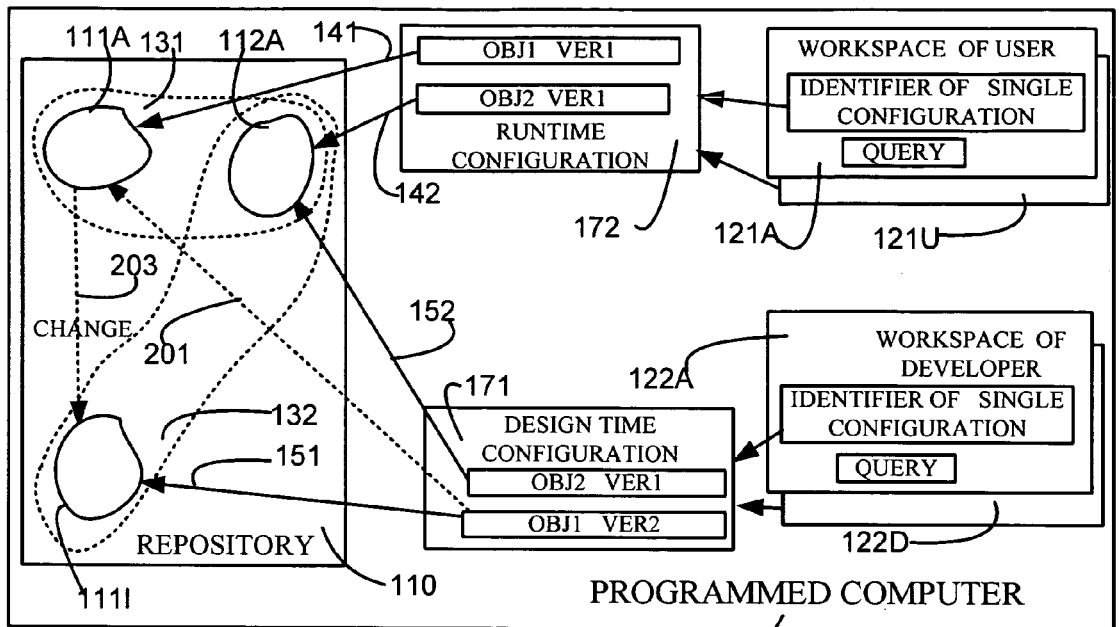

The above-described set up of configurations may be done manually in some embodiments, although in other embodiments configurations are set up automatically. An integration platform 100 of some embodiments of the invention automatically generates and maintains a configuration as illustrated in FIG. 2A and described next. The automatically generated/maintained configuration can be of two types: (a) design time configuration 171 that identifies the most current version of each object in repository 110, and (b) run-time configuration 172 (FIG. 2B) that is used for live operation (i.e. operation without changing the objects in contrast to design use wherein objects are created and/or changed). Initially, when repository 110 is empty, integration platform 100 automatically creates a single configuration 171 which is designated as a design time configuration. The design time configuration 171 (FIG. 2A) is maintained by integration platform 100 to identify the most current version of each object in repository 110.

Specifically, as new objects are created in repository 110, a pair of identifiers (e.g. object identifier and version number) of the newest version of each object is added to configuration 171. For example, a developer may create objects OBJ1 and OBJ2. These objects are automatically designated by integration platform 100 as being of version 1, and configuration 171 contains pair 171A and pair 171 B that respectively uniquely identify the version 1 of OBJ1 and version 1 of OBJ2, i.e. the two objects 111A and 112A (as illustrated by arrows 201 and 152).

At this stage, configuration 172 does not yet exist in integration platform 100. Moreover, note that configuration 171 is commonly identified in each of a number of workspaces 122A-1 22D of a corresponding number of developers. Therefore, configuration 171 is the only configuration being used for processing of any query at this stage. Since configuration 171 is commonly shared among all developers, any change made to an object by one developer is exposed (eventually or alternatively becomes immediately visible) to all developers. At this stage, a number of changes may be made to the objects via use of design time configuration 171. Therefore, design time configuration 171 identifies the most current versions of objects OBJ1 and OBJ2 in the repository 110.

At this stage, integration platform 100 of several embodiments does not make new versions of these objects, and therefore any changes that are made during this stage cannot be undone. Note however, that in other embodiments, integration platform 100 may make new versions of these objects (e.g. in the design schema).

When the developers decide that the objects OBJ1 and OBJ2 are ready for use in live operation, a decision is made to "deploy" these objects. During deployment, a copy 172 of design time configuration 171 is made (as illustrated by dashed arrow 202 in FIG. 2B). Note that during the just-described copying, the current version of each object OBJ1 and OBJ2 is not actually copied, and instead just the identifiers 201 and 152 of the current versions of these objects are copied, to form identifiers 141 and 142 in the copied configuration 172. Therefore, the copied configuration (also called "run time configuration") 172 now identifies the most current versions of objects OBJ1 and OBJ2 (i.e. versions that are currently present in the design time configuration, at the time of deployment).

At this stage, workspaces 121A-121U of one or more users who are to issue queries to repository 110 for live operation thereof, are associated with the run time configuration 172. Note that when these users issue a query, the results are same as the results returned to the developers, because although there are two configurations 171 and 172, repository 110 contains only version 1 of each of objects OBJ1 and OBJ2.

From this stage onwards, integration platform 100 ensures that changes to versions of objects identified by the design time configuration 171 do not affect versions of objects identified by the run time configuration 172. Specifically, the just-described run time configuration 172 (and the information identified thereby) is kept unchanged (i.e. never changed). If any change needs to be made to objects OBJ1 and/or OBJ2, a change is made to the design time configuration 171. For example, if a change is to be made to OBJ1, integration platform 100 automatically creates a copy 111I (as illustrated by dashed arrow 203 in FIG. 2C), replaces an identifier 201 of the old version of object OBJ1 with another identifier 151 of the copy, and makes a change in the newly-made copy, thereby to create version 2 of the object OBJ1 (labeled as item 111I).

At this stage, even if an identical query is issued, the results differ depending on which of the workspaces 121 and 122 (FIG. 1A) issued the query. Specifically, issuing of a query from any user workspace 121A-121U will contain data from version resolved view 131, whereas issuing of a query from any developer workspace 122A-122D will contain data from version resolved view 132. Therefore, at this stage, run time configuration 172 no longer identifies the most current versions of objects OBJ1 and OBJ2, and instead identifies versions that are were present in the design time configuration 171 at the time of deployment. Note that design time configuration 171 continues to identify the most current versions of objects OBJ1 and OBJ2. Use of the same configuration 171 by all developer workspaces 122A-122D ensures that changes in any object are (instantly or eventually) exposed to all developers. At the same time, use of two different kinds of configurations for the two types of workspaces ensures that users are insulated from any changes being made by developers.

Figure 2D:
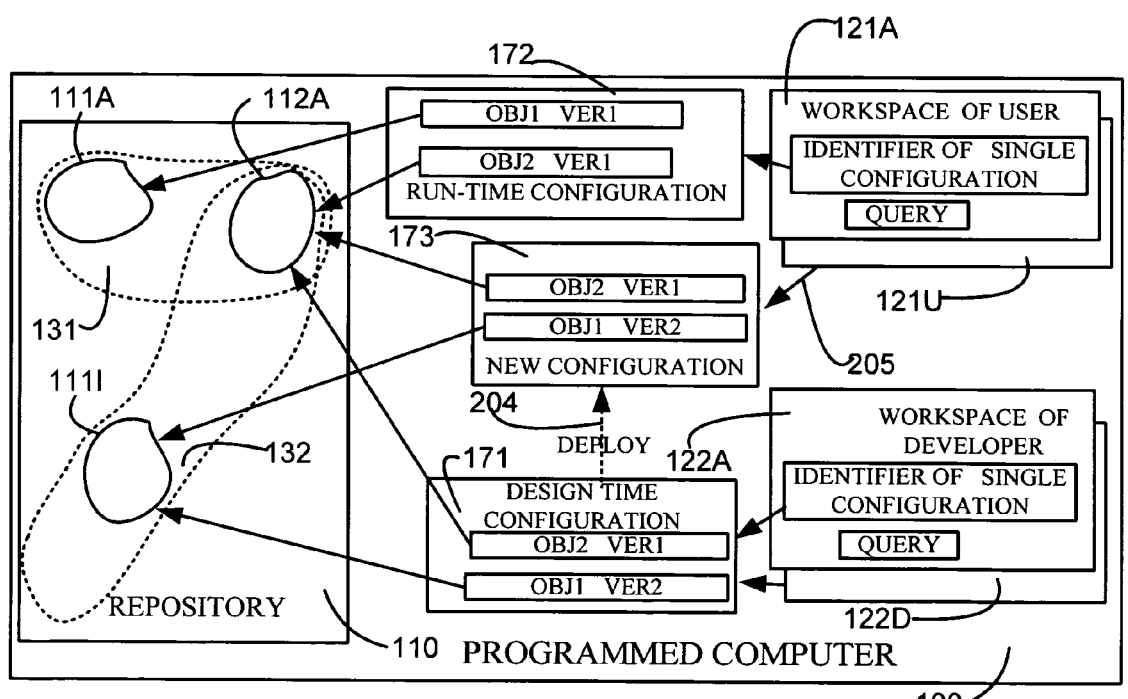
Figure 2E:
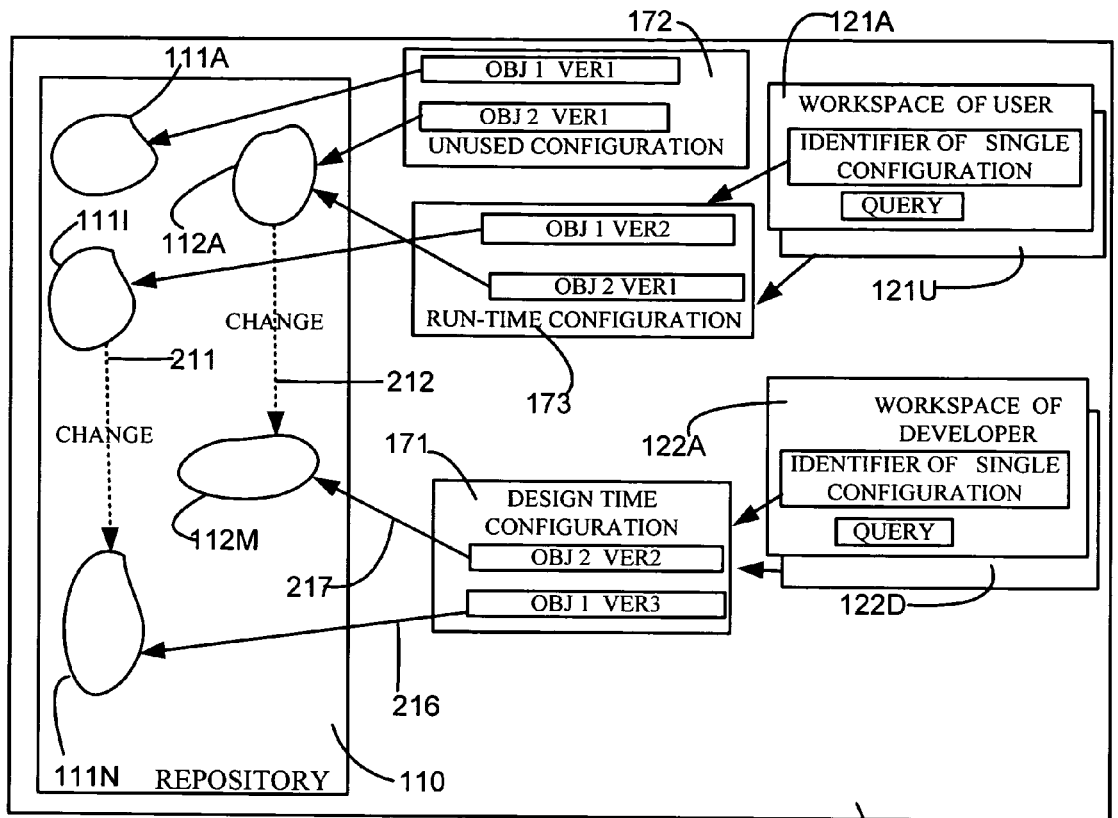

The above-described deployment of design time configuration, and changing of objects identified by the design time configuration can be repeated any number of times by any developer at any time, e.g. as illustrated in FIGS. 2D and 2E which are described next. Specifically, FIG. 2D illustrates deployment of design time configuration 171 a second time, e.g. by copying (as per dashed arrow 204) to form configuration 173 which is a new configuration different from configuration 172 discussed above. In response to the developer's instructions, this configuration 173 is marked as a run time configuration (either automatically, or manually), and may be used by a user, e.g. a user in workspace 121 U is illustrated in FIG. 2D as having their configuration identifier set to configuration 173, as illustrated by arrow 205.

At this stage, configurations 172 and 173 are both run time configurations that co-exist with one another, and each is used to process the same query from the respective users 121A and 121U (FIG. 2D). Note that these two run time configurations co-exist with another configuration, namely the design time configuration 171. In one embodiment, all three configurations 171-173 (FIG. 2D) co-exist in the same computer 100, although in some embodiments the run time configurations exist in a different computer from the computer in which the design time configuration exists. Note that workspaces 122A-122D (FIG. 2D) of all developers contain the same configuration identifier, namely an identifier that points to the design time configuration 171.

At any time, any of the developers can change any of the objects in repository 110, regardless of whether or not that object has been deployed in a run time configuration. For example, in one embodiment illustrated in FIG. 2E, two developers have individually changed objects OBJ1 and OBJ2. As all developers use the same design time configuration 171, a change to object OBJ1 made from workspace 122A is (instantly or eventually) exposed to all developers, including the developer in workspace 122D. Similarly, a change to object OBJ2 made from workspace 122D is also (instantly or eventually) exposed to all developers, including the developer in workspace 122A. When making a change, since each of the two objects to be changed (namely objects OBJ1 and OBJ2) have been already deployed, copies of these objects are made to create a new version 3 of object OBJ1 and a new version 2 of object 2, as illustrated in FIG. 2E by items 111N and 112M. Thereafter, the design time configuration 171 is updated to identify each of the just-described copies, instead of a version that was deployed, as illustrated by arrows 216 and 217.

Note that in several embodiments, once a new version of an object is created (after deployment of a previous version), no further versioning of that object is performed even if any further changes are made to the new version. For example, if a developer in workspace 122A were to modify object 111N, which has the pair of identifiers OBJ1 VER3, the modification is done directly on object 111N, without saving any copy in the server. In such embodiments, versioning of an object is only done if the version of the object to be modified in the design time configuration is same as a version used in another (e.g. run time or otherwise saved) configuration (thereby to indicate that the object has not yet been modified, i.e. after deployment). Therefore, such embodiments limit the number of versions of an object to any number less than or equal to the number of modifications being made. Such limited versioning of objects therefore addresses the issue of excessive cloning.

Figure 3:
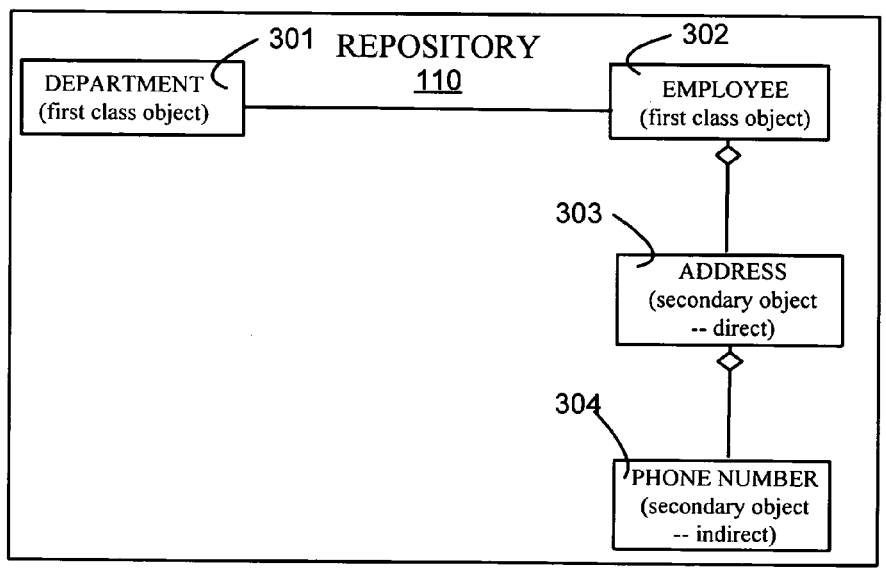
FIG. 3 illustrates, in a class diagram, a sample UML model of a repository containing two first class objects, wherein one first class object has a direct secondary object and an indirect secondary object.

In the following description, the word "object" refers to an object definition which is also known in the art as object type. An example of a UML model implemented in a programmed computer 100 is illustrated in FIG. 3, as follows: an object 301 (labeled "DEPARTMENT") is implemented in repository 300 by a data structure (such as a relational table or a file system which may contain, e.g. two fields that identify a name of the department, and a name of the city in which the department is located). In addition, repository 300 includes another object 302 (labeled "EMPLOYEE") which is implemented by another data structure (which may contain, e.g. at least two fields which identify the employee name, and an identifier of the department to which the employee belongs). Repository 300 includes two additional objects 303 and 304 which are respectively labeled "ADDRESS" and "PHONE NUMBER", which are implemented by two additional data structures as shown in FIG. 3.

All objects 301-304 in repository 300 are of two types: objects 301 and 302 that are not contained in (or aggregated into) any other object (and such objects are called "first class objects"), and objects 303 and 304 which are contained in (or aggregated into) another object (and such objects are called "secondary objects"). Specifically, object 304 (an instance of which contains phone numbers) is contained in object 303 (an instance of which contains addresses), and object 303 in turn is contained in object 302 (an instance of which contains employee information). Therefore, object 303 is a direct secondary object of object 302 and object 304 is an indirect secondary object of object 302. Note that in many embodiments of the type described herein, a secondary object cannot exist independently of a first class object. If one were to add a new object to repository 300 as a direct secondary object of object 304, this new object will become an indirect secondary object of both objects 303 and 302. A first class object hierarchy for EMPLOYEE is EMPLOYEE, ADDRESS, and PHONE NUMBER. The first class object hierarchy for DEPARTMENT is simply DEPARTMENT. Note that the just-described relationships and typing of objects may be identified manually, by a developer, depending on the semantics of the tables in a given specific application.

In some embodiments, a method described in the following pseudo code is used to determine if a class is a first class object:

0. BEGIN
1. Input-UML class->CLS
2. create empty list of UML classes->LIST
3. add CLS to LIST
4. LOOP through LIST
(Note: LIST may grow as a result of operations inside LOOP)
   a. determine supertype of LIST[i] (in terms of inheritance)->SUPER
   b. IF SUPER exists and LIST does not contain SUPER add SUPER to LIST (add to the end of LIST) END IF
   c. determine all subtypes of LIST[i]->SUBCLASSES
   d. LOOP through SUBCLASSES
   IF LIST does not contain SUBCLASSES[j]add SUBCLASSES[j] to LIST (add to the end of LIST)
   END IF END LOOP END LOOP
5. LOOP through LIST
   IF LIST[i] implements any interface RETURN TRUE;
     END
   END IF
6. RETURN FALSE
7. END The above-described type of an object is checked in some embodiments, prior to inserting, updating or deleting the object, and thereafter a design time configuration is changed appropriately. In the example illustrated in FIG. 3, consider creating new version of an EMPLOYEE instance that is currently existing. In this case, the EMPLOYEE instance is duplicated with the same ID (an identifier that identifies all versions of this instance), and a version number is incremented. No other changes need to be made in the EMPLOYEE table in such embodiments, because the EMPLOYEE instance is a first class object. All references to the EMPLOYEE instance in other objects (such as the DEPARTMENT table) remain valid, since the ID of the EMPLOYEE instance has not changed.

Note that when using methods of the type described above, creating a new version of an EMPLOYEE instance does not result in a new version of a direct secondary object, such as the ADDRESS object. Therefore, consider creating a new version of an instance of the object ADDRESS that is already existing, after the EMPLOYEE instance has been versioned as noted above. In this case, a new row will be created for the new ADDRESS instance, with the same ID as the existing instance. In repository 300, all secondary objects store information about the version of the earliest ancestor that is a first class object. Therefore, the new version of ADDRESS instance will point to the new version of EMPLOYEE instance (created as described in the previous paragraph). Moreover, a previous version of the ADDRESS instance will be updated to point to the previous version of EMPLOYEE instance. The just-described acts may be performed implicitly, e.g. when an update needs to be made to an existing instance of the ADDRESS object, since it is a secondary object (and in this case a new version of EMPLOYEE instance must have been created and written to database and if not then this is also done implicitly).

The benefits of this approach are: (a) the ID of an object is constant for each version; (b) creating a new version of EMPLOYEE does not require any updates to DEPARTMENT, as all references are still valid; and (c) creating a new version of EMPLOYEE does not require cloning its hierarchy. As noted above, versioning of an instance of a first class object does not require versioning of any other object's instance. Therefore, maintaining IDs identical when cloning a first class object in such embodiments eliminates the need to clone multiple related objects (potentially all objects). In case of cloning a secondary object of several embodiments, maintaining identical IDs and also maintaining a range of versions of the first class objects that contain the secondary object (e.g. via Vmax and Vmin as discussed below) requires cloning of only one additional object, namely the first class object that is the first ancestor of the secondary object being cloned.

In several embodiments, database schema is responsible for presenting a consistent view of the instances stored in repository 110. Specifically, as noted above, a single version of each instance is presented via views, namely version resolved views. Updates are made to the version resolved views and triggers make the appropriate updates to the related base table(s). The implementation of each view depends on the object's classification:

| Object Classification | View Definition |
|---|---|
| First Class Object | View selects a single version according to the currently selected configuration (the latest version if the Design configuration is selected). |
| Secondary Object (Direct and Indirect) | View selects the appropriate version of the instance based on the version of the owning first class object determined by the currently selected configuration. |

In several embodiments, in addition to columns that are normally present in the table for such an object, one or more additional columns are used for such objects, depending on the type thereof. Specifically, a first class object has an additional column for holding the version number, as shown in the following table. Note that although in several of the following tables, certain exemplary values are shown in the data type column, these values are merely exemplary and other values may be used in other embodiments.

| Column | Datatype | Description |
|---|---|---|
| ID | RAW(16) | ID, identical for all versions of the same instance |
| VER | NUMBER | version of the instance, version is changed explicitly by the user |

Specifically, in the above table, the RAW data type is 16 bytes long, whereas the NUMBER data type is a 32 bit integer. Note that other embodiments may use other data types, e.g. instead of RAW data type, the NUMBER data type may be used (i.e. in the above table, both columns may be NUMBER as shown in all the examples herein). For first class objects, the primary key is a combination of ID plus VER. Examples of first class object tables are:

| DEPARTMENT TABLE | | |
|---|---|---|
| ID | VER | DEPT NAME |
| 1 | 1 | MARKETING |

| EMPLOYEE TABLE | | | |
|---|---|---|---|
| ID | VER | DEPARTMENT | LAST NAME |
| 2 | 1 | 1 | Smith |

Moreover, tables for all secondary objects have three additional columns, namely Vmin, Vmax, FCO, as shown below. An optional column VER may be included in some embodiments of secondary object tables, for use as part of primary key, in which case the definition of primary key is the same for the first class objects and for secondary objects. However, other embodiments do not use a VER column in the secondary object tables and in such a case, the primary key is formed by ID, Vmin, Vmax.

| Column | Datatype | Description |
|---|---|---|
| ID | RAW(16) | ID, identical for all versions of the same instance |
| VER | NUMBER | version of the instance, version is changed at least when the user creates a new version of the first class object that is an ancestor (also called "primary") of this secondary object and the user then creates another version of the secondary object and only then updates the newly-created secondary object; note that version is not changed only when a new version of the first class object is created, and instead it is incremented every time a new cloned row (i.e. new version) of the secondary object is created. As noted above, this column is used for information only and is not used in some embodiments. The value of version of the secondary object is independent of the value of version of the primary first class object |
| Vmin | NUMBER | indicates the range (lower boundary) of versions of primary first class object, that this version is contained in |
| Vmax | NUMBER | indicates the range (upper boundary) of versions of primary first class object, that this version is contained in |
| FCO | RAW(16) | ID of the primary first class object |

For a secondary object of the type described in the above table, the primary key is a combination of ID plus VER (similar to a first class object). In the case of a secondary object, a view selects such secondary object version, that has it's interval [Vmin, Vmax] containing the version of parent FCO, the latter being resolved by use of the appropriate configuration, e.g. in a configuration table.

Note, that for direct secondary objects, the FCO column contains the same value as the column generated from the UML model association, linking child to parent. Thus, strictly speaking, the FCO column is not required in such embodiments. However, usage of the FCO column simplifies the design significantly (specifically view generation). In addition, if in the future, the UML model were to be changed and some secondary object becomes a first class object, having a pre-existing FCO column simplifies migration. Examples of secondary object tables are:

ADDRESS TABLE

| ID | VER | Vmin | Vmax | FCO | STREET | CITY | EMPLOYEE |
|----|-----|------|------|-----|--------|------|----------|
| 3  | 1   | 1    | ∞    | 2   | 123 Church Street | San Francisco | 2 |

PHONE NUMBER TABLE

| ID | VER | Vmin | Vmax | FCO | AREA CODE | NUMBER | ADDRESS |
|----|-----|------|------|-----|-----------|--------|---------|
| 4  | 1   | 1    | ∞    | 2   | 408       | 123-4567 | 3     |

In the above ADDRESS table, note that the column EMPLOYEE contains a value (e.g. '2') that is identical to a value in the column ID in a row of the EMPLOYEE table Similarly, in the PHONE NUMBER table, the column ADDRESS contains a value (e.g. '3') that is identical to a value in the column 'ID' in a row of the ADDRESS table. As noted elsewhere, the above-described additional columns related to versioning, namely VER, Vmin, Vmax and FCO may or may not be presented by the views depending on the embodiment. For example, in some embodiments the users of the views are not explicitly aware of versioning and in such cases these columns are hidden whereas in other embodiments these columns are exposed to users by the views.

In addition, in several embodiments, the database is also used to store a configuration table that identifies the configuration that contains each object and version in repository 110, although as will be apparent to the skilled artisan, the configuration information can be held in other structures that may or may not be implemented in a database. One embodiment of a repository 110 contains the following configuration table.

| Column | Datatype | Description |
|--------|----------|-------------|
| ID     | RAW(16)  | identical for all versions of the same instance |
| VER    | NUMBER   | version of the instance |
| CFG    | VARCHAR(20) | name of the configuration |

An example of a configuration table for the above-described tables is illustrated below.

CONFIGURATION TABLE

| ID | VER | CFG |
|----|-----|-----|
| 1  | 1   | DESIGN |
| 2  | 1   | DESIGN |

When a deployment is made, all rows in the configuration table which correspond to the design time configuration are copied and labeled as runtime as illustrated below.

CONFIGURATION TABLE

| ID | VER | CFG |
|----|-----|-----|
| 1  | 1   | DESIGN |
| 2  | 1   | DESIGN |
| 1  | 1   | RUNTIME |
| 2  | 1   | RUNTIME |

Note that depending on the embodiment, there may be more than one run time configuration that are simultaneously deployed, wherein different run time configurations are accessed by different applications for example.

In the configuration table, the CFG column identifies a specific configuration by name. It serves two purposes. First, an arbitrary (not necessarily latest) version of an instance can be included in a design configuration, and if necessary multiple design configurations can be supported in the future by using different version numbers with the name (e.g. DESIGN1, DESIGN2 etc). Second, it allows one to record runtime configurations that are created but not deployed. Note that in such embodiments, the configuration table (or other such data structure) records runtime configurations, regardless of whether they are deployed or not. In some embodiments, the design configuration is used when modifying the data in the repository, whereas the runtime configuration is used only for reading the data in the repository.

Note, that in several embodiments, the "runtime" configuration is stored in "design" tables. The primary key for the configuration table is combination of ID plus CFG. In several embodiments, there is only one design configuration per system, and it always contains the latest version of an instance that is present in the system. If a new version of an object (other than the latest version) is created, "branching" will take place. Branching can be supported in the future by including an additional column and identifying a specific branch, in all base tables.

Figure 4:
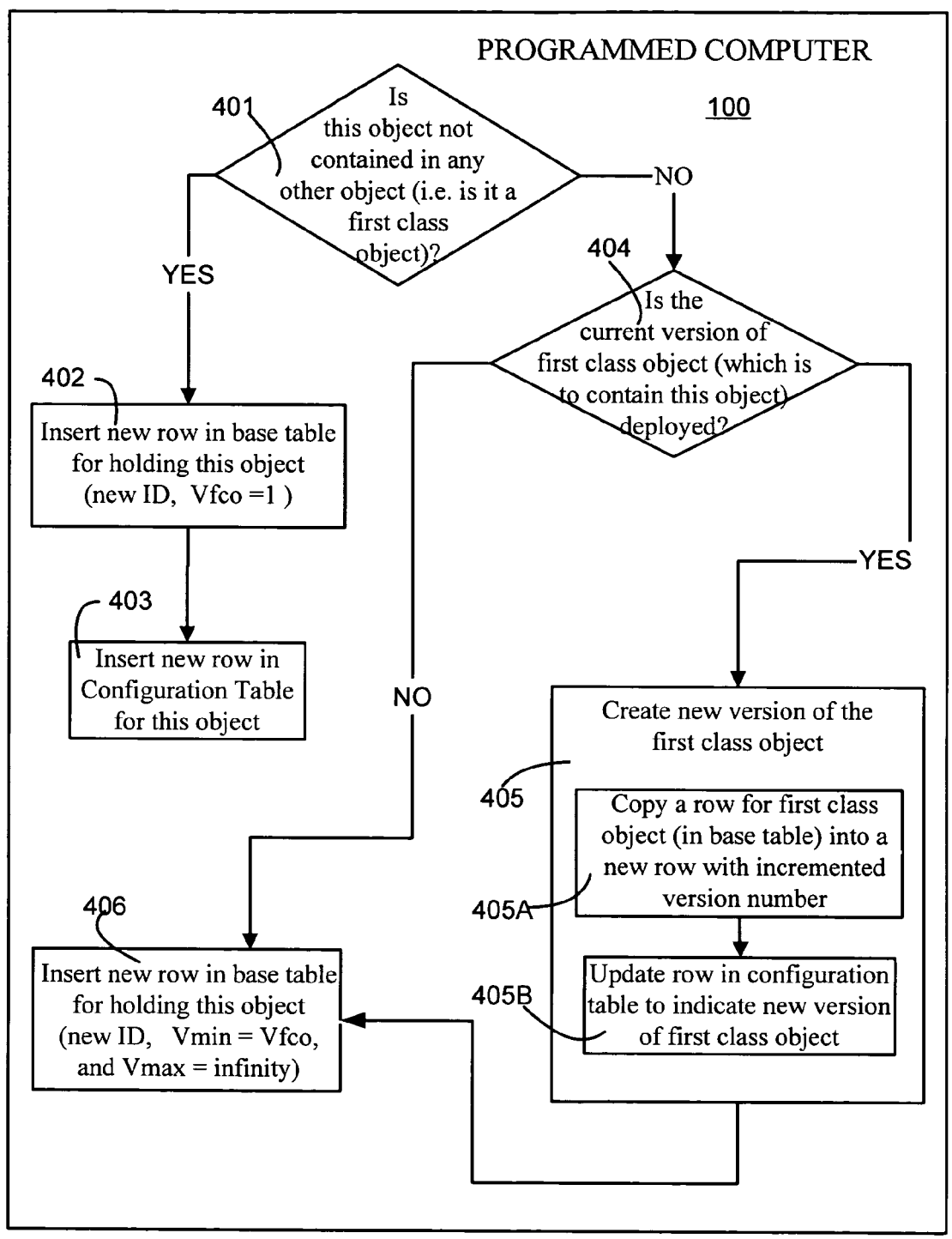
FIGS. 4-6 illustrate, in flow charts, acts that are performed in some embodiments of the computer of FIG. 1A, during insertion, updating and deletion of an object in the repository.

When an object is to be inserted into such tables for the first time, a check is made as to whether the object is a first class object (as per act 401 in FIG. 4) and if so it is inserted in the normal manner (as per act 402), and in addition, a design time configuration is changed to identify the newly-added object (as per act 403).

In several embodiments, classification information of objects (whether an object is first class or secondary) is stored in a UML model that is used to generate the versioning schema. Each object classification has its own set of insert, update, delete triggers, which contain the appropriate logic according to whether the object is a first class object or a secondary object. In such embodiments, the information for act 401 in the flow charts (to answer the question is it a first class object?) is implicitly handled when the versioned schema is generated.

Note that in some embodiments, additional business logic may be implemented in the insert/update/delete triggers, to, for example, ensure uniqueness, referential integrity between foreign keys, or other checks. In other embodiments, such business logic might be implemented by code using the versioning schema, or may not be implemented at all.

Consider an example of a new employee "Blake" joining the marketing department, in which case a new object instance is to be added to the repository 110. In this example, a check is made (as per act 401) as to whether or not the new instance to be added to the EMPLOYEE table is a first class object. In this example, the answer is yes, and hence a row is added to the EMPLOYEE table as shown below. When adding this row, a unique value for ID is generated across all objects in repository 110 (e.g. by simply incrementing the last ID and in this example the value 5 is returned). Note that the version number is 1 because a row for Blake is being inserted for the very first time.

| EMPLOYEE TABLE | | | |
|---|---|---|---|
| ID | VER | DEPARTMENT | LAST NAME |
| 2 | 1 | 1 | Smith |
| 5 | 1 | 1 | Blake |

In this particular example, the above-described configuration table is also updated, as follows:

| CONFIGURATION TABLE | | |
|---|---|---|
| ID | VER | CFG |
| 1 | 1 | DESIGN |
| 2 | 1 | DESIGN |
| 1 | 1 | RUNTIME |
| 2 | 1 | RUNTIME |
| 5 | 1 | DESIGN |

At this stage of the example, if a query is issued as to the employees, if the query originates in a workspace that identifies the configuration as DESIGN, then two rows are returned (e.g. Smith and Blake) but if the workspace identifies the configuration as RUNTIME then only one row is returned (e.g. Smith).

In act 401, if the object to be inserted is not a first class object, then act 404 (FIG. 4) is performed. In act 404, a check is made as to whether the current version of the first class object (which is to contain this object) is present in any other configuration (e.g. in the runtime configuration if deployed). If the answer in act 404 is no, then act 406 is performed to insert a new row (for the to-be-inserted object) into the base table. Note that at this stage, it is not necessary to add a row to the configuration table to identify the object being inserted because the object is a secondary object (i.e. rows are not added to the configuration table for secondary objects). In act 404, if the answer is yes, then an operation 405 is performed to version the first class object, followed by act 406 to insert the new row for the to-be-inserted object.

During operation 405 two acts 405A and 405B are performed as follows. Specifically, in act 405A, a row in the base table of the first class object for the current version thereof is copied, and the version number in the copy is incremented. Thereafter, in act 405B, a new row is inserted in the configuration table for the new version of first class object. After operation 405, act 406 is performed in a manner similar to act 402 described above, except that values in columns Vmin, Vmax and FCO are set as follows. Specifically, Vmin is set to the current version number (i.e. the just-incremented value) of the first class object that contains the object being inserted. Moreover, Vmax is set to be infinity, and FCO is set to the ID of the first class object. Note that in acts 404-406 described above, no distinction is made between direct and indirect secondary objects.

Consider an example of adding a street address "345 Main Street, San Jose" for employee Blake, in which case a new secondary object instance is to be added to the repository 110. In this example, a check is made (as per act 401) as to whether or not the new instance to be added to ADDRESS table is a first class object, and in this case the result is no. Hence, act 404 is performed to check if the related first class object, namely the row for Blake in the EMPLOYEE table has been deployed. As there is no deployment of this row, act 406 is performed. In act 406, a new row is inserted into the ADDRESS table, with Vmin set to 1, Vmax set to infinity and FCO set to 5. Therefore, after act 406, the ADDRESS table appears as follows:

| ADDRESS TABLE | | | | | | | |
|---|---|---|---|---|---|---|---|
| ID | VER | Vmin | Vmax | FCO | STREET | CITY | EMPLOYEE |
| 3 | 1 | 1 | ∞ | 2 | 123 Church Street | San Francisco | 2 |
| 6 | 1 | 1 | ∞ | 5 | 345 Main Street | San Jose | 5 |

When adding this row to the ADDRESS table, a unique value for ID is generated across all objects in repository 110 (e.g. by simply incrementing the last ID and in this example the value 5 is returned). Note that the version number is 1 because a row for Blake's address is being inserted for the very first time. In the just-described example, there is no change to the configuration table, because the configuration table does not contain a reference to any secondary object.

Values in the three columns, FCO, Vmin and Vmax for a secondary object are determined as follows in some embodiments of the invention. Specifically, the owning (aggregation) relation between a direct secondary object and a first class object is set manually, thus value of FCO is always known. When a new instance of a secondary object is created, the version column is set to 1, Vmin is set to version of first class object, and Vmax is set to infinity (in one implementation, it is set to NULL which is treated as infinity).

The case of an indirect secondary object is similar to direct secondary object, except that the first class object is not known, although the secondary object's immediate parent is known. However, in such embodiments, it is guaranteed that a parent is always written before a child, thus the information about first class object of the parent (of the to-be-inserted secondary object) can be obtained by selecting these values from the parent table. At this stage, this case is identical to "direct" secondary object case (described above).

To summarize, at this stage, in the design configuration there are two rows in the EMPLOYEE table, and for each employee there is a row in the ADDRESS table, but in the runtime configuration there is only one row in the EMPLOYEE table, and for the single employee there is a row in the ADDRESS table. At this stage, if there were any change in any row of the EMPLOYEE table which results in an increase in the version number thereof, no change needs to be made to the ADDRESS table, because the increased version number still falls within the range Vmin-Vmax, i.e. between 1 and infinity.

To the extent any operation on a secondary object affects a first class object, the configuration table is updated as described next. Specifically, assume that the row for Blake in the EMPLOYEE table had been deployed in the above-described street address example, so that the configuration table appears as follows:

| CONFIGURATION TABLE | | |
|---|---|---|
| ID | VER | CFG |
| 1 | 1 | DESIGN |
| 2 | 1 | DESIGN |
| 5 | 1 | DESIGN |
| 1 | 1 | RUNTIME |
| 2 | 1 | RUNTIME |
| 5 | 1 | RUNTIME |

In such a case, to insert a row in the ADDRESS table, the answer in act 404 is yes, and hence act 406 is performed, but only after operation 405 is performed to version the first class object, namely the row for Blake in the EMPLOYEE table. Specifically, in act 405A, a new row is added to the EMPLOYEE table with an incremented version number (all else in this row remains the same), so that the table appears as follows:

| EMPLOYEE TABLE | | | |
|---|---|---|---|
| ID | VER | DEPARTMENT | LAST NAME |
| 2 | 1 | 1 | Smith |
| 5 | 1 | 1 | Blake |
| 5 | 2 | 1 | Blake |

Thereafter, in act 405B, a row in the configuration table for employee Blake is updated to contain the new version number, so that the table appears as follows:

| CONFIGURATION TABLE | | |
|---|---|---|
| ID | VER | CFG |
| 1 | 1 | DESIGN |
| 2 | 1 | DESIGN |
| 5 | 2 | DESIGN |
| 1 | 1 | RUNTIME |
| 2 | 1 | RUNTIME |
| 5 | 1 | RUNTIME |

Thereafter, when act 406 is performed, the ADDRESS table appears as follows:

| ADDRESS TABLE | | | | | | | |
|---|---|---|---|---|---|---|---|
| ID | VER | Vmin | Vmax | FCO | STREET | CITY | EMPLOYEE |
| 3 | 1 | 1 | ∞ | 2 | 123 Church Street | San Francisco | 2 |

-continued

| ADDRESS TABLE | | | | | | | |
|---|---|---|---|---|---|---|---|
| ID | VER | Vmin | Vmax | FCO | STREET | CITY | EMPLOYEE |
| 6 | 1 | 2 | ∞ | 5 | 345 Main Street | San Jose | 5 |

Figure 5:
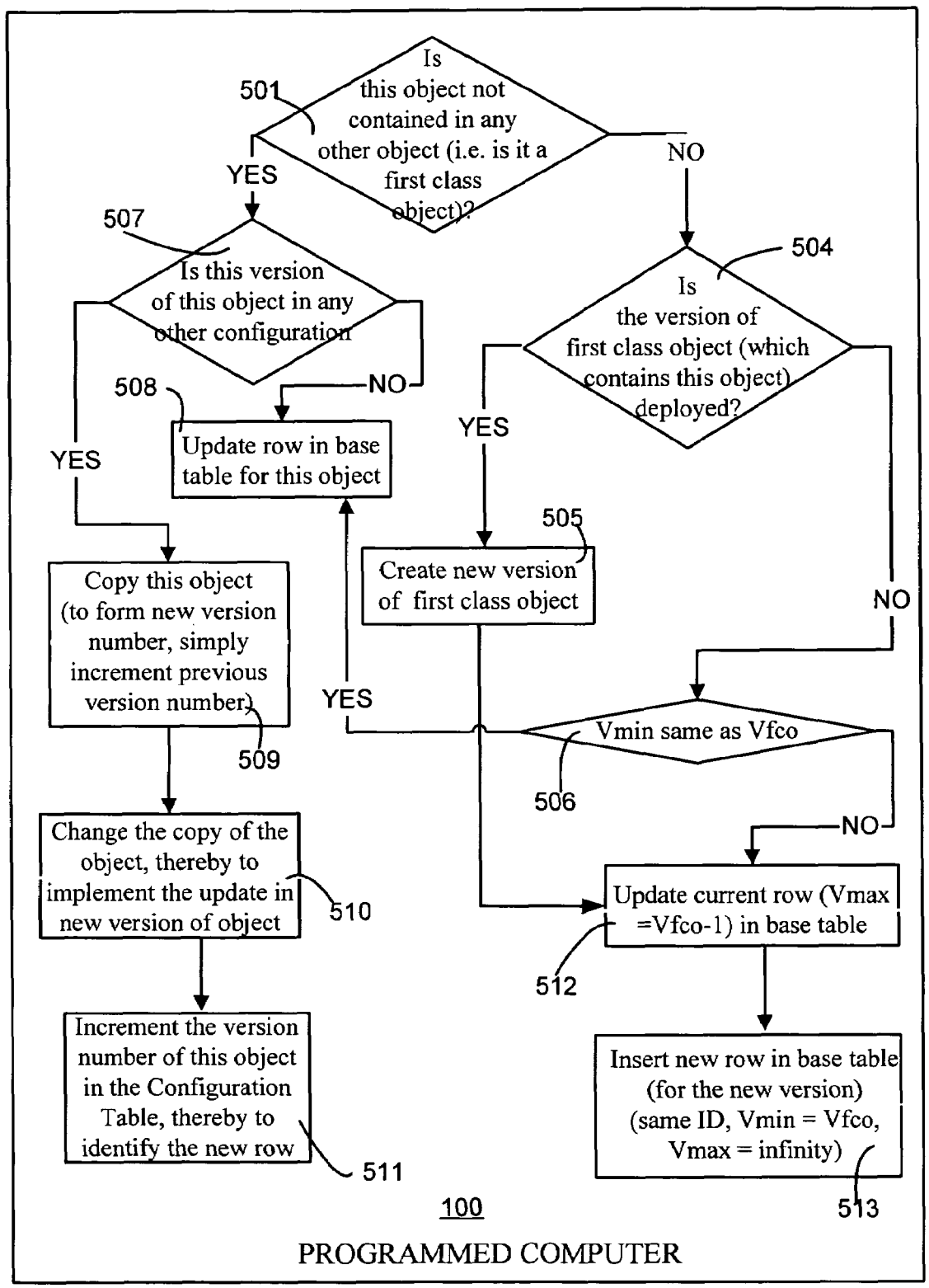
Figure 6:
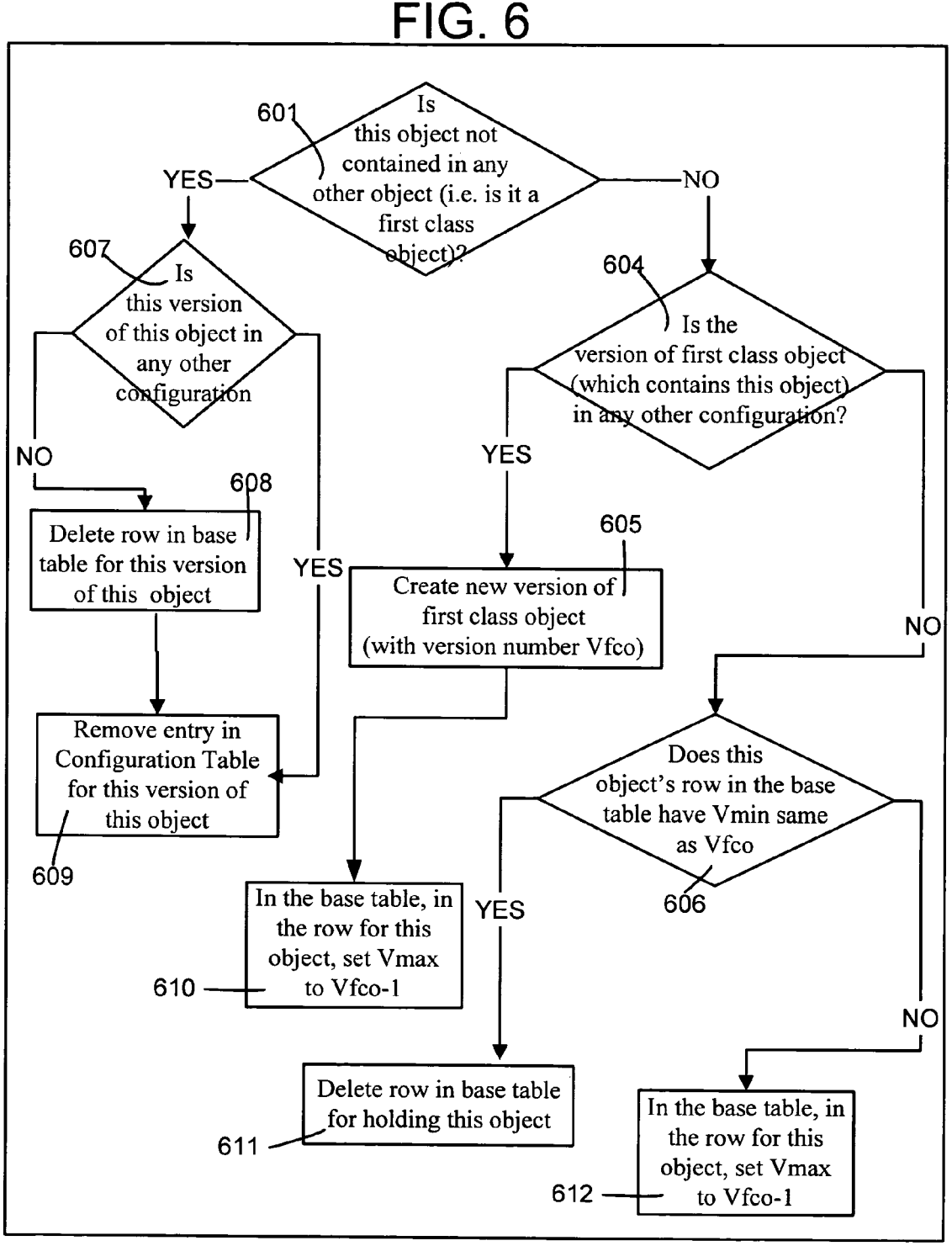

When a previously-inserted object is to be updated, then again a check is made as to whether the object is a first class object (as per act 501 in FIG. 5). Note that act 501 is identical to act 401 described above. If the answer is yes, then another check is made (as per act 507) as to whether this version of this object belongs to any configuration other than design. As noted elsewhere, when an object is deployed, the object belongs to a runtime configuration which is a configuration other than design. Certain embodiments may have configurations that are neither design nor runtime, e.g. there may be a test configuration that is at an interim stage between design and runtime.

If the answer in act 507 is no, then the object is simply updated as per act 508. Note that updating the object has no effect on any other version of this object, and therefore users of other configurations are not impacted. Note, however, when the update happens, any currently-held information (which is being overwritten) is lost forever. However, the loss occurs only in a version of the object that is currently identified by the design time configuration (i.e. there is no loss of information in any other configuration).

If the answer in act 507 is yes, then the object is copied (as per act 509) and the copy is assigned an incremented version number. In addition, the design time configuration is updated to now identify the just-described copy of the object (as per act 511), and a change required by the update is made in the just-described copy of the object (as per act 510). Such acts may be performed in a different order than the order described, e.g. act 510 may be performed between acts 509 and 511 as illustrated in FIG. 5.

Consider an example of changing the names of all employees to uppercase, e.g. assume both names in the above-described EMPLOYEE table are to be changed. In this example, the row for Blake has not yet been deployed to runtime, so the configuration table appears as follows:

| CONFIGURATION TABLE | | |
|---|---|---|
| ID | VER | CFG |
| 1 | 1 | DESIGN |
| 2 | 1 | DESIGN |
| 1 | 1 | RUNTIME |
| 2 | 1 | RUNTIME |
| 5 | 1 | DESIGN |

Assume the second row (for Blake) is being processed, and initially a check is made (as per act 501) as to whether or not the EMPLOYEE table is a first class object, and in this case the answer is yes. Next, act 507 checks if this row is in any other configuration, and the answer is no (because the row for "Blake" has not yet been deployed). Therefore, the row for "Blake" is simply updated as per act 508. At this stage, the EMPLOYEE table appears as follows:

| EMPLOYEE TABLE | | | |
|---|---|---|---|
| ID | VER | DEPARTMENT | LAST NAME |
| 2 | 1 | 1 | Smith |
| 5 | 1 | 1 | BLAKE |

In this example, assume the first row (for Smith) is now being processed, and again a check is made (as per act 501) as to whether or not the EMPLOYEE table is a first class object, and in this case the answer is yes. Next, act 507 checks if this row is in any other configuration, and the answer is yes (because the row for "Smith" has already been deployed to RUNTIME configuration). Therefore, a new row for "Smith" is created, by copying this row, and thereafter incrementing the version number (as per act 509). At this stage, the EMPLOYEE table appears as follows:

| EMPLOYEE TABLE | | | |
|---|---|---|---|
| ID | VER | DEPARTMENT | LAST NAME |
| 2 | 1 | 1 | Smith |
| 5 | 1 | 1 | BLAKE |
| 2 | 2 | 1 | Smith |

Next, as per act 510, the newly-inserted row in the EMPLOYEE table (which at this point is still just a copy) is updated as necessary, i.e. the word Smith is replaced by the word SMITH, and hence the EMPLOYEE table appears as follows:

| EMPLOYEE TABLE | | | |
|---|---|---|---|
| ID | VER | DEPARTMENT | LAST NAME |
| 2 | 1 | 1 | Smith |
| 5 | 1 | 1 | BLAKE |
| 2 | 2 | 1 | SMITH |

Furthermore, a row in the configuration table which references this object (for Smith which has the ID 2) is updated by incrementing the version number, from 1 to 2, as per act 511, and as shown below:

| CONFIGURATION TABLE | | |
|---|---|---|
| ID | VER | CFG |
| 1 | 1 | DESIGN |
| 2 | 2 | DESIGN |
| 1 | 1 | RUNTIME |
| 2 | 1 | RUNTIME |
| 5 | 1 | DESIGN |

In act 501 if the answer is no, then an update is being performed on a secondary object (e.g. the ADDRESS table or the PHONE NUMBER table). In such a case, the above-described check is again made, i.e. whether a version of the first class object that contains the secondary object (either directly or indirectly) is present in another configuration, as per act 504. Note that act 504 is similar or identical to act 404 described above. In certain embodiments, the version of first class object that is checked in act 504 is the version that is currently in the design configuration. However, as will be apparent to the skilled artisan, the version of first class object that is in the configuration corresponding to the current workspace is checked in act 504, and in certain embodiments, this corresponds to the version currently in the design configuration. If present in another configuration, then the first class object is versioned as per operation 505.

Operation 505 is similar or identical to operation 405. Specifically, in operation 505, a row which holds the most recent version of the first class object is copied in the above-described manner (with an incremented version number) to form a new version of the first class object. Moreover, a row in the configuration table for this first class object is updated, with the incremented version number, thereby to identify the copied first class object. After operation 505, acts 512 and 513 are performed as described next.

In act 506 if the answer is yes, then act 508 (described above) is performed, to simply update the row (in the base table) for this object. In act 506 if the answer is no, then acts 512 and 513 are performed as described next. Specifically, in act 512, a value in the column Vmax in the current row in the base table for the to-be-updated object is changed to Vfco−1, wherein, Vfco is the most current version number of the first class object. Thereafter, in act 513, a new row is inserted in the base table, to form a new version of the to-be-updated object, and during insertion the following values are used: the same ID is used as the previous version of the object being updated, Vmin is set to Vfco, and Vmax is set to infinity.

Consider an example of changing all addresses to uppercase, e.g. assume both addresses in the above-described ADDRESS table are to be changed. In this example, the row for Blake in the EMPLOYEE table has not yet been deployed to runtime (and also there is no changing of the employee names to upper case), and therefore EMPLOYEE table appears at this stage as follows:

| EMPLOYEE TABLE | | | |
|---|---|---|---|
| ID | VER | DEPARTMENT | LAST NAME |
| 2 | 1 | 1 | Smith |
| 5 | 1 | 1 | Blake |

Therefore, when processing the address change for Smith, in act 504 the answer is yes, and therefore operation 505 is performed, and thereafter the EMPLOYEE table appears as follows:

| EMPLOYEE TABLE | | | |
|---|---|---|---|
| ID | VER | DEPARTMENT | LAST NAME |
| 2 | 1 | 1 | Smith |
| 5 | 1 | 1 | Blake |
| 2 | 2 | 1 | Smith |

In the above table, there is no difference between the first row and the third row except for the version number (which has been incremented from 1 to 2). In operation 505, a row in the configuration table which references this object (for Smith which has the ID 2) is updated by incrementing the version number, from 1 to 2, as shown below:

CONFIGURATION TABLE

| ID | VER | CFG |
|---|---|---|
| 1 | 1 | DESIGN |
| 2 | 2 | DESIGN |
| 1 | 1 | RUNTIME |
| 2 | 1 | RUNTIME |
| 5 | 1 | DESIGN |

Next, a value of Vmin in the ADDRESS table for the current version of the row is compared with a corresponding value of Vfco in act 506. There is no match in act 506 because the Vfco value of 2 was recently incremented (during operation 505) from its previous value 1. On the other hand, Vmin is at most equal to the previous value of Vfco (prior to incrementing), which was 1. Therefore, act 512 is performed, and the Vmax value is updated to be same as the Vfco−1, i.e. value 1. At this stage the ADDRESS table appears as follows:

ADDRESS TABLE

| ID | VER | Vmin | Vmax | FCO | STREET | CITY | EMPLOYEE |
|---|---|---|---|---|---|---|---|
| 3 | 1 | 1 | 1 | 2 | 123 Church Street | San Francisco | 2 |
| 6 | 1 | 1 | ∞ | 5 | 345 Main Street | San Jose | 5 |

Thereafter, a new row is inserted in the ADDRESS table as per act 513, to hold the new address, as follows:

ADDRESS TABLE

| ID | VER | Vmin | Vmax | FCO | STREET | CITY | EMPLOYEE |
|---|---|---|---|---|---|---|---|
| 3 | 1 | 1 | 1 | 2 | 123 Church Street | San Francisco | 2 |
| 6 | 1 | 1 | ∞ | 5 | 345 Main Street | San Jose | 5 |
| 3 | 1 | 2 | ∞ | 2 | 123 CHURCH STREET | SAN FRANCISCO | 2 |

In the above-described example, when processing the address change for Blake, in act 504 the answer is no, and therefore operation 505 is skipped, and hence the EMPLOYEE table remains the same. Next, a value of Vmin in the ADDRESS table for the current version of the row is compared with a corresponding value of Vfco in act 506. There is a match in act 506, and therefore act 508 is performed. Specifically, in act 508, a row in the ADDRESS table for Blake's address is simply updated, as shown below.

ADDRESS TABLE

| ID | VER | Vmin | Vmax | FCO | STREET | CITY | EMPLOYEE |
|---|---|---|---|---|---|---|---|
| 3 | 1 | 1 | 1 | 2 | 123 Church Street | San Francisco | 2 |
| 6 | 1 | 1 | ∞ | 5 | 345 MAIN STREET | SAN JOSE | 5 |
| 3 | 1 | 2 | ∞ | 2 | 123 CHURCH STREET | SAN FRANCISCO | 2 |

It is worth noting, that if a user performs consecutive updates of a secondary object, that for example has been deployed, then a new version is created only on the first update, all subsequent updates do not result in creation of a new version.

To delete a previously-inserted object, once again a check is made if the object (to be deleted) is a first class object as per act 601 (which is same as each of acts 501 and 401 described above). If the answer is yes, then another check is again made, as to whether the object belongs to any configuration other than design (e.g. deployed) as per act 607 (which is same as act 507 described above). In act 607, if the answer is no then the current version of the object is deleted as per act 608, and thereafter act 609 is performed. In act 607 if the answer is yes, then act 609 is performed without performance of act 608. In act 609, an entry for this object is removed from the design time configuration. Therefore, if the object to be deleted has been deployed (or belongs to any configuration other than design time), then the object itself is not deleted from the repository, so that the object is available to users of other configurations.

Consider an example of deleting all employees from the above-described EMPLOYEE table, which is reproduced below for convenience, along with the corresponding configuration table.

EMPLOYEE TABLE

| ID | VER | DEPARTMENT | LAST NAME |
|---|---|---|---|
| 2 | 1 | 1 | Smith |
| 5 | 1 | 1 | BLAKE |
| 2 | 2 | 1 | SMITH |

CONFIGURATION TABLE

| ID | VER | CFG |
|---|---|---|
| 1 | 1 | DESIGN |
| 2 | 2 | DESIGN |
| 1 | 1 | RUNTIME |
| 2 | 1 | RUNTIME |
| 5 | 1 | DESIGN |

In this example, assume the second row (for Blake) is to be deleted. In this example, initially a check is made (as per act 601) as to whether or not the EMPLOYEE table is a first class object, and in this case the answer is yes. Next, act 607 checks if this row is in any other configuration, and the answer is no (because the row for "Blake" has not yet been deployed). Therefore, the current version of the row for "Blake", which is of VER 1 is deleted as per act 608. At this stage, the EMPLOYEE table appears as follows:

| EMPLOYEE TABLE | | | |
|---|---|---|---|
| ID | VER | DEPARTMENT | LAST NAME |
| 2 | 1 | 1 | Smith |
| 2 | 2 | 1 | SMITH |

In addition, act 609 is performed by deleting a row for OBJ 5 VER 1 which is in the DESIGN configuration. At this stage the configuration table appears as follows:

| CONFIGURATION TABLE | | |
|---|---|---|
| ID | VER | CFG |
| 1 | 1 | DESIGN |
| 2 | 2 | DESIGN |
| 1 | 1 | RUNTIME |
| 2 | 1 | RUNTIME |

In the above-described example, assume the second row (for Smith) is also to be deleted. The EMPLOYEE table at this stage is reproduced below for convenience:

| EMPLOYEE TABLE | | | |
|---|---|---|---|
| ID | VER | DEPARTMENT | LAST NAME |
| 2 | 1 | 1 | Smith |
| 2 | 2 | 1 | SMITH |

In this example, initially a check is made (as per act 601) as to whether or not the EMPLOYEE table is a first class object, and in this case the answer is yes. Next, act 607 checks if this row is in any other configuration, and the answer is no (because the version of "Smith" (in this case version 2 in all upper case) has not been deployed). Therefore, in act 609, a row for OBJ 2 VER 2 which is in the DESIGN configuration is deleted from the EMPLOYEE table, and the entry is removed from the configuration table. At this stage the configuration and employee tables appear as follows:

| EMPLOYEE TABLE | | | |
|---|---|---|---|
| ID | VER | DEPARTMENT | LAST NAME |
| 2 | 1 | 1 | Smith |

| CONFIGURATION TABLE | | |
|---|---|---|
| ID | VER | CFG |
| 1 | 1 | DESIGN |
| 1 | 1 | RUNTIME |
| 2 | 1 | RUNTIME |

Note that if version 2 of Smith had been deployed, then the answer in act 607 would be yes, and only the entry in the configuration table would be removed (the entry in the EMPLOYEE table is not removed so that it remains available to users of the deployed configuration).

In act 601 if the answer is no, then a secondary object (e.g. a row in the ADDRESS table or the PHONE NUMBER table) is being deleted. In such a case, the above-described check is again made, i.e. whether the version of the first class object that contains the secondary object (either directly or indirectly) is present in another configuration, as per act 604. Note that act 604 is similar or identical to acts 404 and 504 described above. If present in another configuration, then the first class object is versioned as per operation 605.

Operation 605 is similar or identical to operations 405 and 505 described above. Specifically, in operation 505, a row which holds the most recent version of the first class object is copied in the above-described manner (with an incremented version number) to form a new version of the first class object. Moreover, a row in the configuration table for this first class object is updated, with the incremented version number, thereby to identify the copied first class object. After operation 605, act 610 is performed to simply change a single value in a row for the to-be-deleted object in the base table, namely the value in column Vmax is set to Vfco−1. Note that the object itself is not deleted, so as to allow that object to be reached from other configurations.

In act 604, if the answer is no, then act 606 is performed, to check if the row for the to-be-deleted object in the base table has Vmin same as Vfco. In act 606 if the answer is yes, the row in base table for holding this object is deleted as per act 611. If the answer is no in act 606, then act 612 is performed to change a single value in a row for the to-be-deleted object in the base table, namely the value in column Vmax is set to Vfco−1.

Consider an example of deleting all addresses, e.g. assume both addresses in the above-described ADDRESS table are to be deleted. In this example, the row for Blake in the EMPLOYEE table has not yet been deployed to runtime (and also there is no changing of the employee names or of addresses to upper case). All three tables at this stage are reproduced below for convenience:

| CONFIGURATION TABLE | | |
|---|---|---|
| ID | VER | CFG |
| 1 | 1 | DESIGN |
| 1 | 1 | RUNTIME |
| 2 | 1 | RUNTIME |
| 2 | 1 | DESIGN |
| 5 | 1 | DESIGN |

| ADDRESS TABLE | | | | | | | |
|---|---|---|---|---|---|---|---|
| ID | VER | Vmin | Vmax | FCO | STREET | CITY | EMPLOYEE |
| 3 | 1 | 1 | 1 | 2 | 123 Church Street | San Francisco | 2 |
| 6 | 1 | 1 | ∞ | 5 | 345 Main Street | San Jose | 5 |

EMPLOYEE TABLE

| ID | VER | DEPARTMENT | LAST NAME |
|---|---|---|---|
| 2 | 1 | 1 | Smith |
| 5 | 1 | 1 | Blake |

Therefore, when deleting the address for Smith, in act 604 the answer is yes, and therefore operation 605 is performed, and thereafter the EMPLOYEE table appears as shown below.

EMPLOYEE TABLE

| ID | VER | DEPARTMENT | LAST NAME |
|---|---|---|---|
| 2 | 1 | 1 | Smith |
| 5 | 1 | 1 | Blake |
| 2 | 2 | 1 | Smith |

In the above EMPLOYEE table, there is no difference between the first row and the third row except for the version number (which has been incremented from 1 to 2). In operation 605, a row in the configuration table which references this object (for Smith which has the ID 2) is updated by incrementing the version number, from 1 to 2, as shown below:

CONFIGURATION TABLE

| ID | VER | CFG |
|---|---|---|
| 1 | 1 | DESIGN |
| 2 | 2 | DESIGN |
| 1 | 1 | RUNTIME |
| 2 | 1 | RUNTIME |
| 5 | 1 | DESIGN |

Next, a value of Vmax in the ADDRESS table for the current version of the row is set to one less than the Vfco value of 2, which was recently incremented (during operation 605), i.e. to the previous value 1 of Vfco. At this stage the ADDRESS table appears as follows:

ADDRESS TABLE

| ID | VER | Vmin | Vmax | FCO | STREET | CITY | EMPLOYEE |
|---|---|---|---|---|---|---|---|
| 3 | 1 | 1 | 1 | 2 | 123 Church Street | San Francisco | 2 |
| 6 | 1 | 1 | ∞ | 5 | 345 Main Street | San Jose | 5 |

In the above-described example, when deleting the address for Blake, in act 604 the answer is no, and therefore operation 605 is skipped, and hence the EMPLOYEE table remains the same. Next, a value of Vmin in the ADDRESS table for the current version of the row is compared with a corresponding value of Vfco in the configuration table, as per act 606. There is a match in act 606, and therefore act 611 is performed. Specifically, in act 611, a row in the ADDRESS table for Blake's address is simply deleted, and the ADDRESS table appears as shown below:

ADDRESS TABLE

| ID | VER | Vmin | Vmax | FCO | STREET | CITY |
|---|---|---|---|---|---|---|
| 3 | 1 | 1 | 1 | 2 | 123 Church Street | San Francisco |

Several embodiments of the invention implement a repository in a relational database in a computer 710 (FIG. 7) by use of tables 717 to hold objects that are identified by a design time configuration. In addition, another computer 720 that is connected to computer 710 holds objects that have been deployed in another set of tables 727 which are also referred to as "runtime tables." In several such embodiments, runtime tables 727 are identical to design tables 717 in structure, and are generated by the same schema, although in alternative embodiments this is not true. Regarding the data stored in these tables 717 and 727, objects (which are implemented as rows) in runtime tables 727 are present in (or have identical copies in) the corresponding design tables 717. Moreover, all objects in design tables 717 that have been deployed are present in (or have identical copies in) the corresponding run time tables 717.

One difference between runtime tables 727 and design tables 717 is that design tables 717 hold objects that have been not yet deployed. Another difference between runtime tables 727 and design tables 717 is related to where they are implemented: these two sets of tables are implemented in two different computers 710 and 720. Computer 720 is more powerful than (e.g. has more memory than and/or has higher processing frequency than) computer 710, so as to improve the speed with which queries against the runtime tables are executed. Note however, in some embodiments speed of execution of a query is not an issue and in such embodiments, runtime tables 727 and design tables 717 may be implemented in the same computer, and in other embodiments a single set of tables may be used (i.e. runtime tables 727 and design tables 717 are merged).

In some embodiments, all runtime tables 727, regardless of whether they are for first class objects or secondary objects require one additional column: CFG, which identifies a specific runtime configuration, the object belongs to. As noted above, a VER column is not required, however, it is provided for informational purposes.

| Column | Datatype | Description |
|---|---|---|
| ID | RAW(16) | ID of the deployed object |
| VER | NUMBER | version of the instance |
| CFG | RAW(16) | ID of configuration, the object belongs to |

The primary key is the combination of ID plus CFG. Data from design tables are copied into runtime tables during deployment, at which point information about deployed data is stored redundantly: in both design and runtime tables.

In the case of runtime tables 727, views are implemented in some embodiments, to select an appropriate version of each instance, based on a specified runtime configuration. If non-version resolved data is required, then the base tables are queried directly with SQL in such embodiments, e.g. using a metadata service to determine the table and column names. Note that in certain embodiments, use of the metadata service is not specific to unversioned data, or to querying base tables (because it is used when querying views also). In many embodiments the metadata service is not relevant to methods of the type described herein (i.e. the table and column names may be determined in other ways well known to the skilled artisan in view of the disclosure). However, in some embodiments, a metadata service (which is a collection of Java classes) is used to determine (amongst other things) the view, table, column names etc. that correspond to the Java representation of the database objects. In other embodiments, this information may be stored in other database tables, or not used at all—the code used to access the versioned schema may simply use hard coded view names etc. Therefore the metadata service is not intrinsic to the versioned schema and instead it is a design decision for the code that will use the versioned schema.

Several embodiments of the type described herein do not define a corresponding view for every query that may be issued. Instead, such embodiments define design views 714 and runtime 724 which present a version resolved view of each table 717 and 727 respectively. In such embodiments, the view returns only a single version of each object in the table, according to the currently selected configuration. Users can write their own queries against these views 714 and 724, without having to be aware of the versioning mechanism, because in such embodiments the version filtering is encapsulated in the version resolved views.

As is well known in the art, a view is a presentation of certain data contained in one or more tables or other views. Specifically, views take the output of a query and treat that output as a table, and hence a view may be thought of as a stored query, or a virtual table. Views can be used in most of the software programs at locations where tables are normally used, e.g. one can query views, and with some restrictions, one can update, insert into and delete from views. However, a view is not allocated any storage (other than for a query) because the view is defined by the query that extracts or derives data that is stored in tables. All operations performed on a view actually affect the data in a table (also called "base table") of the view and are subject to the integrity constraints and triggers of the base tables. The just-described base table can be itself a view or an actual table.

Also as is well known in the art, a trigger is a procedure written in a programming language, such as PL/SQL, Java or C, to execute implicitly whenever a table or view is modified or when some user actions or database system actions occur. Triggers can be written to fire whenever one of the following operations occur: DML statements on a particular schema object (Insert/Update/Delete), DDL statements issued within a schema or database, user logon or logoff events, server errors, database startup, or instance shutdown.

In the embodiments illustrated in FIG. 7, certain type of triggers that are known in the art as "INSTEAD OF" triggers 718 are defined against specific database views, and exist independent of software (called "versioning package") 716. In one particular embodiment, the triggers 718 make use of the versioning package 716, which contains software program code common to the triggers, and which is used to clone a new version of an object (e.g. acts 405,505,605 in the flowcharts). In other embodiments, this common cloning logic could be carried out in the triggers themselves (but in this case there would be duplication of this logic in the insert/update/delete triggers).

Triggers 718 of some embodiments are defined to transparently modify views that cannot be modified directly through DML statements. In several such embodiments, the triggers 718 are discrete pieces of code attached to each view. Versioning package 716 implements the cloning operation used in creating new versions (as this code is common to insert, update and delete triggers - update and delete of secondary objects can cause versioning of the FCO). Versioning package 716 may contain PUSQL procedures (one procedure for each first class object) for which pseudo-code is provided below. Note that each procedure takes an ID of an object as input parameter and creates a new version of this first class object.

procedure ver_<fco_name>(id1 RAW) is ver NUMBER (10); begin
select version into ver from DCFG where id=id1 and cfg=<current configuration>
insert into TIP_<fco_name>_t(<attr1>, attr2>, . . . <assoc1>, <assoc2>. . . version)
select <attr1>, <attr2>, . . . <assoc1>, <assoc2> . . . version+1) from TIP_<fco_name>_t where id=id1 and version=ver;
update DCFG set version=ver+1 where id=id1 and version=ver and cfg=<current configuration>end;

In some embodiments, programmed computer 710 fires triggers 718 instead of executing the triggering statement (Insert/Update/Delete). In some embodiments, versioning package 716 performs maintenance of all version columns transparently by use of PL/SQL in the database.

In addition to views 714 and 724, programmed computers 710 and 720 of some embodiments also include a layer of software 713 and 723 (called "persistency service") which maps the objects in a programming language (such as Java) into rows of a relational database (such as Oracle). Programmed computer 710 of certain embodiments also includes software (called "user interface") 711 that interfaces in a graphical manner with the user. Programmed computer 720 also includes software (called "runtime service") 721 that provides an interface to other computers to interact with computer 720 via messages (such as packets in conformance with the Internet Protocol). Specifically, runtime service 721 is responsible for receiving such messages from the outside world (e.g. from a remote computer that is connected to computer 720 via the Internet), and converts each message into operations to be performed on objects (e.g. in Java).

Computers 710 and 720 may contain any hardware normally used to implement computers. For example, in some embodiments, each of computers 710 and 720 may be implemented as a computer system 800 illustrated in FIG. 8 and described below. Specifically, computer system 800 includes a bus 802 (FIG. 8) or other communication mechanism for communicating information, and a processor 804 coupled with bus 802 for processing information. Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

As described elsewhere herein, versioning is provided by computer system 800 in response to processor 804 executing one or more sequences of one or more instructions contained in main memory 806. Such instructions may be read into main memory 806 from another computer-readable medium, such as storage device 810. Execution of the sequences of instructions contained in main memory 806 causes processor 804 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 804 for execution. Such a medium may take many forms, including but not limited to, a non-volatile medium, a volatile medium, and a transmission medium. Non-volatile media include, for example, optical or magnetic disks, such as storage device 810. Volatile media include dynamic memory, such as main memory 806. Transmission media include coaxial cables, copper wire and fiber optics, including the wires that comprise bus 802. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 804 for execution. For example, the instructions may initially be carried on a magnetic disk of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. Local network 822 may interconnect the two computers 710 and 720 (described above). For example, communication interface 818 may be an integrated services digital network (ISDN) card or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are exemplary forms of carrier waves transporting the information.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818. In accordance with the invention, one such downloaded application provides for implementing fine grain versioning within software configuration management systems as described herein.

The received code may be executed by processor 804 as it is received, and/or stored in storage device 810, or other non-volatile storage for later execution. In this manner, computer system 800 may obtain application code in the form of a carrier wave.

In several embodiments, the above description refers to a system with one table with ID,Vers, Config, although other embodiments have two tables—there is a DCFG table which has ID, Vers,and CFG. Moreover, in some embodiments, the CFG column is a RAW(16) that stores the ID of the configuration, and there is another table that stores the configuration name and the ID of the configuration. Therefore, although in some embodiments a single configuration appears as follows:

| ID | Vers | CFG |
|---|---|---|
| 1 | 1 | DESIGN |
| 2 | 1 | DESIGN |
| 5 | 1 | DESIGN |
| 1 | 1 | RUNTIME |
| 2 | 1 | RUNTIME |
| 5 | 1 | RUNTIME |

Other embodiments use two tables as follows:

| ID | Ver | CFG |
|---|---|---|
| 1 | 1 | 200 |
| 2 | 1 | 200 |
| 5 | 1 | 200 |
| 1 | 1 | 202 |
| 2 | 1 | 202 |
| 5 | 1 | 202 |

| ID | Configuration |
|---|---|
| 200 | DESIGN |
| 202 | RUNTIME |

Note that a mechanism described in U.S. Pat. No. 6,460,052 avoids the problem of cloning chain reaction (described above) only for relationships between certain objects called "first class" objects (described below). However in this mechanism of U.S. Pat. No. 6,460,052, other objects called "secondary" objects are cloned when a first class object is versioned. In contrast, methods of the type described herein for several embodiments only clone secondary objects on as needed basis, and thereby eliminate unnecessary cloning of both first class and secondary objects.

Numerous modifications and adaptations of the embodiments and examples described herein will be apparent to the skilled artisan in view of the disclosure. Numerous such modifications and adaptations are encompassed by the attached claims.

The invention claimed is:

1. A method of managing a repository containing multiple versions of objects, the method being performed by a computer, the method comprising:
   establishing a plurality of configurations, each configuration containing no more than one version of an object;
   associating no more than one configuration with a workspace from which a query can be issued;
   receiving an instruction to insert a first object into said repository, and in response to said receiving of said instruction checking if the first object is contained in another object, and if not performing acts (a) and (b) else performing act (c):
   (a) inserting into a first table in a memory of said computer, a first row comprising a plurality of values that define the first object, a unique identifier of the first object, and a version number of the first object; and
   (b) inserting into a second table in said memory, a second row comprising the unique identifier of the first object, the version number of the first object, and an identifier of a current configuration as identified by a workspace from which said instruction is received;
   wherein acts (a) and (b) are performed in any order relative to one another, and alternatively
   (c) inserting into a third table in said memory, a third row comprising a plurality of values that define the first object, a unique identifier of the first object, and at least a current version number of a second object which contains the first object, the second object being not contained in any other object.

2. The method of claim 1 wherein a third object is located between the first object and the second object, and the first object is indirectly contained in the second object, via the third object.

3. The method of claim 1 wherein the second table in said memory comprises a plurality of configurations including the current configuration, each configuration in said plurality of configurations containing no more than one version of the first object.

4. The method of claim 1 further comprising if the first object is contained in the second object, storing in the third row in the third table of act (c) a maximum version number of the second object, the current version number being stored as a minimum version number of the second object.

5. The method of claim 4 further comprising checking if the second object belongs to a configuration that has been deployed and if so:
   in a fourth row which contains a most recent version of the first object in the third table to be used in act (c), set the maximum version number to be the current version number of the second object;
   inserting into the first table, a fifth row for the second object, using a new version number obtained by incrementing the current version number of the second object;
   using the new version number when performing act (c); and
   inserting in the second table a sixth row containing the new version number of the second object and the identifier of the current configuration.

6. The method of claim 1 further comprising receiving another instruction to update the first object, and checking if the first object is contained in any other object.

7. The method of claim 6 further comprising, if the first object is not contained in any other object:
   checking if the first object belongs to a configuration that has been deployed and if not deployed then updating a row in the first table that holds the first object, and if deployed then creating a new version of the first object in the first table.

8. The method of claim 7 further comprising, if the first object is contained in the second object:
   checking if the second object is deployed, and if deployed creating a new version of the second object.

9. The method of claim 1 further comprising receiving another instruction to delete the first object, and checking if the first object is contained in any other object.

10. The method of claim 9 further comprising, if the first object is not contained in any other object:
    checking if the first object belongs to a configuration that has been deployed and if not deployed then deleting the first row in the first table; and
    deleting the second row in the second table in said memory.

11. The method of claim 9 further comprising, if the first object is contained in the second object:
    checking if the second object is deployed, and if deployed creating a new version of the second object.

12. A non-volatile medium comprising a plurality of instructions to be executed by a computer, said plurality of instructions comprising:
    instructions to establish a plurality of configurations, each configuration containing no more than one version of an object;
    instructions to associate no more than one configuration with a workspace from which a query can be issued;
    instructions to receive a first instruction to insert a first object into a repository, and instructions to respond to receipt of said first instruction by checking if the first object is contained in another object, and if not performing acts (a) and (b) else performing act (c):
    (a) inserting into a first table in a memory, a first row comprising a plurality of values that define the first object, a unique identifier of the first object, and a version number of the first object; and
    (b) inserting into a second table in said memory, a second row comprising the unique identifier of the first object, the version number of the first object, and an identifier of a current configuration as identified by a workspace from which said instruction is received;
    wherein acts (a) and (b) are performed in any order relative to one another, and alternatively
    (c) inserting into a third table in said memory, a third row comprising a plurality of values that define the first object, a unique identifier of the first object, and at least a current version number of a second object which contains the first object, the second object being not contained in any other object.

13. The non-volatile medium of claim 12 further comprising the repository, the third table comprising a first column for holding a maximum version number of the second object and a second column for holding a minimum version number of the second object, the current version number being stored in the second column.

14. The non-volatile medium of claim 12 wherein said non-volatile medium comprises an optical disk.

15. The non-volatile medium of claim 12 wherein said non-volatile medium comprises a magnetic disk.

16. A computer comprising:

a storage medium comprising a repository containing multiple versions of objects;

means, coupled to the storage medium, for establishing a plurality of configurations, each configuration containing no more than one version of an object;

means, coupled to the establishing means and coupled to the storage medium, for associating in a memory only one configuration with a workspace of a person who can issue a query;

means, coupled to the storage medium, responsive to an instruction to insert the object, for checking if the object to be inserted is contained in another object and if so generating a second signal else generating a first signal;

means, coupled to the storage medium and to the means for checking, responsive to the first signal, for inserting into a table in said memory, a row comprising a plurality of values that define the object, a unique identifier of the object, and a version number of the object and inserting into another table, another row comprising the unique identifier of the object, the version number of the object, and an identifier of a current configuration as identified by a workspace from which said instruction is received by said means for checking; and means, coupled to the storage medium and to the means for checking, responsive to the second signal, for inserting into yet another table in said memory, yet another row comprising a plurality of values that define the object, a unique identifier of the object, and at least a current version number of said another object in which the object is contained.

* * * * *

UNITED STATES PATENT AND TRADEMARK OFFICE
CERTIFICATE OF CORRECTION

PATENT NO. : 7,457,817 B2  Page 1 of 1
APPLICATION NO. : 10/734860
DATED : November 25, 2008
INVENTOR(S) : Krishnaswamy et al.

It is certified that error appears in the above-identified patent and that said Letters Patent is hereby corrected as shown below:

In column 7, line 6, delete "FIG.1 A" and insert -- FIG. 1A --, therefor.

Signed and Sealed this

Seventeenth Day of August, 2010

David J. Kappos
*Director of the United States Patent and Trademark Office*